US012254711B2

(12) United States Patent
Maripina et al.

(10) Patent No.: US 12,254,711 B2
(45) Date of Patent: Mar. 18, 2025

(54) METHODS AND SYSTEMS FOR AUTOMATIC DOCUMENT PATTERN RECOGNITION AND ANALYSIS

(71) Applicant: HighRadius Corp., Houston, TX (US)

(72) Inventors: Hashwanth Maripina, Hyderabad (IN);
Mohit Bansal, Hyderabad (IN);
Debanwesh Bose, Hyderabad (IN);
Harshita Srivastava, Hyderabad (IN);
Aditya Ankur, Hyderabad (IN)

(73) Assignee: HighRadius Corp., Houston, TX (US)

( * ) Notice: Subject to any disclaimer, the term of this patent is extended or adjusted under 35 U.S.C. 154(b) by 360 days.

(21) Appl. No.: 17/873,915

(22) Filed: Jul. 26, 2022

(65) Prior Publication Data

US 2024/0037975 A1 Feb. 1, 2024

(51) Int. Cl.
*G06V 30/418* (2022.01)

(52) U.S. Cl.
CPC .................................. *G06V 30/418* (2022.01)

(58) Field of Classification Search
CPC .. G06V 30/418; G06V 30/416; G06V 30/412; G06V 30/413; G06V 30/414; G06V 10/764; G06V 10/765; G06V 30/10; G06V 30/1448; G06V 10/225; G06V 20/95; G06Q 40/12; G06Q 10/10; G06Q 30/04; G06N 3/08; G06N 3/045; G06N 20/00; G06N 20/20; G06N 3/09; G06N 5/01; G06N 7/01; G06F 16/93; G06F 16/31; G06F 16/3344; G06F 16/387; G06F 18/21; G06F 18/2148; G06F 18/22; G06F 18/2431; G06F 18/24765; G06T 2207/20084; G06T 2207/30176
See application file for complete search history.

(56) References Cited

U.S. PATENT DOCUMENTS

| | | | |
|---|---|---|---|
| 10,339,373 B1 * | 7/2019 | Yellapragada | G06V 30/418 |
| 10,402,163 B2 * | 9/2019 | Ghatage | G06F 7/02 |
| 11,087,245 B2 * | 8/2021 | Subramanian | G06N 7/01 |
| 11,195,008 B2 * | 12/2021 | Zhang | G06V 30/1914 |
| 11,798,100 B2 * | 10/2023 | Howard | G06N 3/08 |
| 11,860,950 B2 * | 1/2024 | Wyle | G06V 30/414 |
| 2011/0091092 A1 * | 4/2011 | Nepomniachtchi | G06Q 20/042 382/137 |

(Continued)

*Primary Examiner* — Michael S Osinski
(74) *Attorney, Agent, or Firm* — Quarles & Brady LLP

(57) ABSTRACT

Novel tools and techniques are provided for implementing automatic document pattern recognition and analysis. In various embodiments, a computing system might receive one or more first documents containing first remittance information. The computing system might analyze the one or more first documents to extract first remittance information from the first document by obtaining one or more historical documents and correlating the one or more first documents to the one or more historical documents. Next, based on the correlation of the one or more first documents to the one or more historical documents, the computing system might determine at least one historical document that correlates to the one or more first documents. Additionally, the computing system might extract the first remittance information from the one or more first documents based on the at least one historical document.

19 Claims, 11 Drawing Sheets

(56) References Cited

U.S. PATENT DOCUMENTS

| | | | |
|---|---|---|---|
| 2011/0313900 A1* | 12/2011 | Falkenborg | G06Q 40/12 705/30 |
| 2018/0032804 A1* | 2/2018 | Yellapragada | G06T 3/40 |
| 2018/0040073 A1* | 2/2018 | Ghosh | G06Q 20/207 |
| 2018/0232204 A1* | 8/2018 | Ghatage | G06F 7/02 |
| 2020/0117892 A1* | 4/2020 | Mills, Jr. | G06V 30/416 |
| 2020/0226503 A1* | 7/2020 | Subramanian | G06Q 10/04 |
| 2021/0133498 A1* | 5/2021 | Zhang | G06F 18/28 |
| 2021/0350516 A1* | 11/2021 | Tang | G06F 16/93 |
| 2022/0044011 A1* | 2/2022 | Shanmugasundaram | G06F 40/216 |
| 2022/0318315 A1* | 10/2022 | Wyle | G06V 30/414 |
| 2024/0020328 A1* | 1/2024 | Puram | G06F 16/353 |
| 2024/0046684 A1* | 2/2024 | Tata | G06N 3/08 |
| 2024/0086468 A1* | 3/2024 | Wyle | G06N 5/046 |
| 2024/0185151 A1* | 6/2024 | Kumar | G06V 30/268 |

* cited by examiner

Issue Date: 01/01/2022   Payment Due: 4/1/2022

BCS2000 Enterprise, INC
1234 Pine Lane
Denver, CO 80121

| Vendor Name | Vendor ID | Purchase Order No. | Discount Amount | Total Amount Paid |
|---|---|---|---|---|
| Home Depot | 123456 | 123 | $10.00 | $90.00 |
| Invoice No. | | | | |
| 54321 | | | | |
| Total Amount | | | | |
| $100.00 | | | | |

From: Enterprise, INC
To: Company, LLC
Account: 123456789

Check Date: 1/1/2022         Check No. 120

| | Amount Billed | Discount Taken | Amount Paid |
|---|---|---|---|
| This Check | $200.00 | $100.00 | $100.00 |
| Year to Date | | | |

405b

From: Enterprise, INC
To: Company, LLC
Account: 123456789

Check Date: 2/1/2022         Check No. 122

| | Amount Billed | Discount Taken | Amount Paid |
|---|---|---|---|
| This Check | 1000.00 | $250.00 | $750.00 |
| Year to Date | | | |

405c

From: Enterprise, INC
To: Company, LLC
Account: 123456789

Check Date: 3/1/2022         Check No. 123

| | Amount Billed | Discount Taken | Amount Paid |
|---|---|---|---|
| This Check | $100.00 | $0.00 | $100.00 |
| Year to Date | $1300.00 | $350.00 | $950.00 |

METHODS AND SYSTEMS FOR AUTOMATIC DOCUMENT PATTERN RECOGNITION AND ANALYSIS

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing automatic document pattern recognition and analysis, and, more particularly, to methods, systems, and apparatuses for implementing automatic document pattern recognition and analysis to reduce identification time, extraction time, and handling time of remittance information.

BACKGROUND

Conventionally, financial or accounting departments receive inbound remittance information, invoice information, payment information, and/or the like from customers, vendors, etc. The inbound remittance information, invoice information, payment information, and/or the like often comes in many different types, forms, or templates, etc. Analysts typically have to manually review the types, forms, or templates, etc. to track and enter the remittance information, invoice information, payment information, and/or the like into an accounts payable account, an accounts receivable account, a general ledger, and/or the like. This manual tracking and entry process is time consuming and could result in the entry of incorrect information.

Thus, there is a need for development of systems, apparatuses, and methods that are capable of automatically analyzing, identifying, and extracting remittance information, invoice information, payment information, and/or the like from one or more document types, templates, or forms. Further, there is a need to significantly cut down the computing resources deployed and time spent by the finance and accounting departments to manually enter remittance information, invoice information, payment information, and/or the like and to increase efficiency of the finance and accounting departments.

Hence, there is a need for more robust and scalable solutions for implementing automatic document pattern recognition and analysis, and, more particularly, for methods, systems, and apparatuses for implementing automatic document pattern recognition and analysis to reduce identification time, extraction time, and handling time of remittance information.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 3A and 3B (collectively, "FIG. 3") are example remittance documents for implementing automatic document pattern recognition and analysis to reduce identification time, extraction time, entry time, and handling time of remittance information, in accordance with various embodiments.

FIG. 4 is an example cluster of historical document templates for implementing automatic document pattern recognition and analysis to reduce identification time, extraction time, entry time, and handling time of remittance information, in accordance with various embodiments.

DETAILED DESCRIPTION OF CERTAIN EMBODIMENTS

Overview

Figure 1:
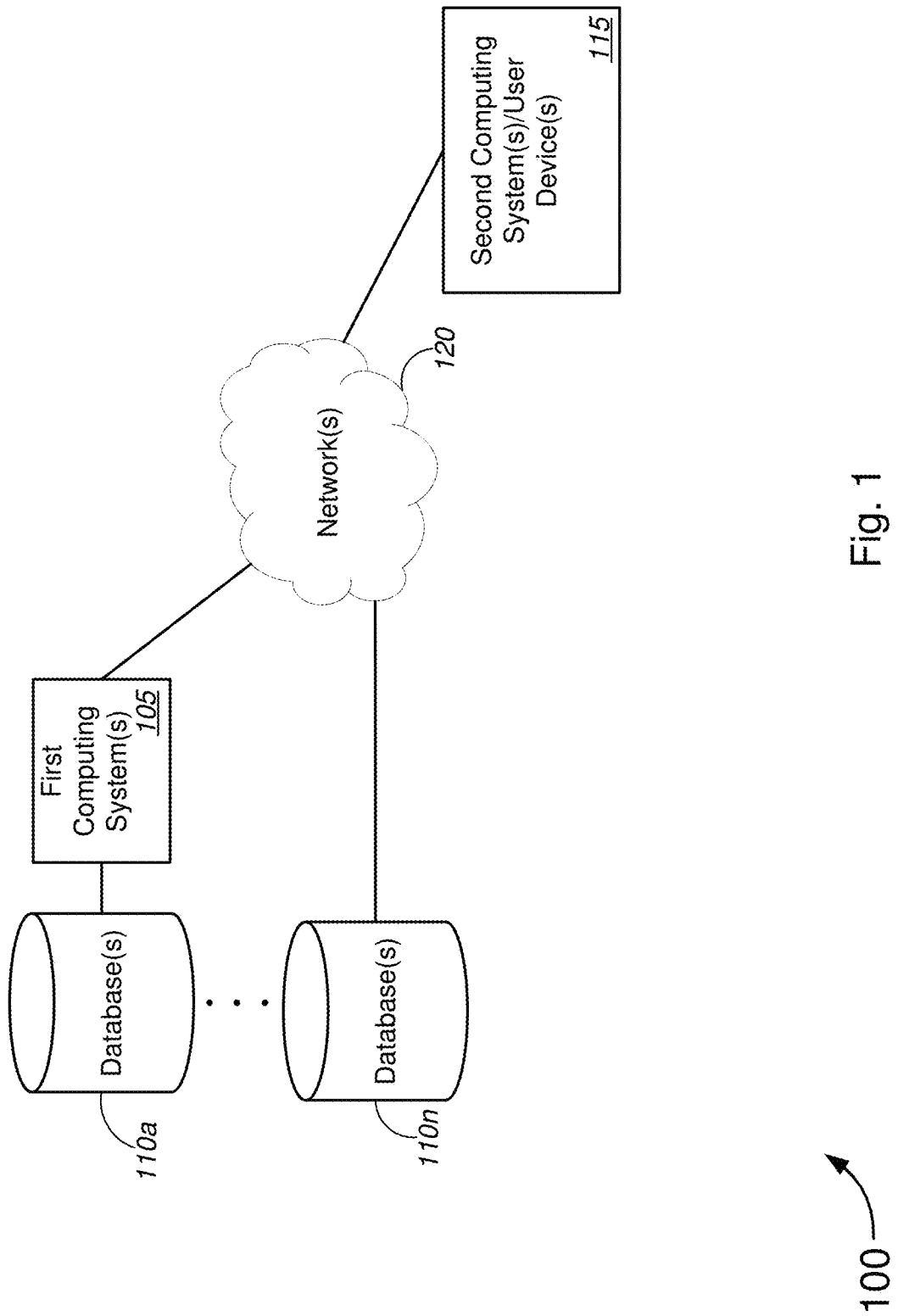
FIG. 1 is a schematic diagram illustrating a system for implementing automatic document pattern recognition and analysis to reduce identification time, extraction time, entry time, and handling time of remittance information, in accordance with various embodiments.

Various embodiments provide tools and techniques for implementing automatic document pattern recognition and analysis, and, more particularly, provide tools and techniques for implementing methods, systems, and apparatuses for implementing automatic document pattern recognition and analysis to reduce identification time, extraction time, and handling time of remittance information.

In various embodiments, a computing system might receive a first document containing first remittance information. The computing system might analyze the first document to extract first remittance information from the first document. In order to analyze the first document to extract first remittance information from the first document, the computing system might obtain one or more historical documents containing historical remittance information and correlate, using one or more machine learning algorithms, the one or more historical documents and the first document to determine whether at least one historical document pattern of the one or more historical document patterns correlates to the first document. Next, the computing system may determine that the at least one historical document pattern of the one or more historical document patterns correlates to the first document. Based on a determination that the at least one historical document pattern of the one or more historical document patterns correlates to the first document, the computing system might extract the first remittance information from the first document based on the least one historical document pattern.

In some instances, analyzing, using the computing system, the first document to extract first remittance information from the first document and extracting, using the computing system, the first remittance information from the first document based on the least one historical document pattern occurs in real-time after the first document has been received.

In further cases, the one or more historical document patterns may be used to generate one or more historical vectors associated with the one or more historical document patterns. The computing system may cluster the one or more historical vectors into one or more document clusters based on a first similarity between the one or more historical vectors. The computing system may then correlate a first vector associated with the first document with the one or more document clusters to determine whether the first vector correlates to the one or more document clusters. Based on a determination that the first vector correlates to the one or more document clusters, the remittance information from the first document may be extracted based on the least one historical document patterns contained within the document cluster.

In various embodiments, in order to extract the remittance information, the computing system might use at least one historical document to identify remittance information in the first document extract. In some instances, the computing system might identify an invoice associated with the first remittance information of the first document and at least one of a payment amount, a discount amount, a total amount of the invoice, or a date of the invoice associated with the first remittance information of the first document and map invoice to at least one of the payment amount, the discount amount, the total amount of the invoice, or the date of the invoice.

Several advantages may be realized by implementing the embodiments described herein. For example, by analyzing, using the computing system, the first document to extract first remittance information from the first document and extracting, using the computing system, the first remittance information from the first document based on the least one historical document pattern in real-time as the first document is received by the computing system, data extracted from the first document may be entered and updated in real time without requiring manual entry or updates by one or more users. This significantly reduces data entry functions of financial and accounting departments and improves computing efficiency by automatically entering remittance information. Additionally, the computing system can automatically cluster one or more similar historical forms, one or more similar historical templates, or one or more similar historical patterns to determine whether the first document correlates to one or more similar historical forms, one or more similar historical templates, or one or more similar historical patterns to facilitate data extraction. The computing system may learn from the one or more historical document patterns how to extract remittance information from the first document. Additionally, retrieved or extracted remittance information may be automatically associated with an outstanding invoice of a customer or a payment request by a vendor without requiring a user to manually determine what invoice or payment request is associated with the remittance information contained in the first document. Further, the computing system can minimize errors that occur in manual entry of remittance information.

These are all improvements over prior art where remittance information contained in documents, forms, templates, or receipts would be entered manually. Instead, the remittance information can be identified and extracted in real-time when documents, forms, templates, or receipts are received. In summary, all embodiments described in this disclosure make identification, extraction, and entry of remittance information more efficient and effective. These and other aspects of the tools and techniques for implementing automatic document pattern recognition and analysis, and, more particularly, provide tools and techniques for implementing methods, systems, and apparatuses for implementing automatic document pattern recognition and analysis to reduce identification time, extraction time, and handling time of remittance information are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, data entry technology, data mapping technology, data extraction technology, data clustering technology, machine learning technology, and/or the like. In other aspects, certain embodiments can improve the functioning of user equipment or systems themselves (e.g., data entry technology, data mapping technology, data extraction technology, data clustering technology, machine learning technology, etc.), for example, by providing real-time data entry associated with one or more first documents as the one or more first documents are received by a computing system, by improving the speed and accuracy of the user equipment to in real-time automatically identify and extract data from one or more first documents, by clustering similar document patterns to efficiently and accurately identify and extract data from one or more first or other documents, and/or the like. For instance, the following steps may be performed in real-time as one or more first documents are received by a computing system: analyzing, using the computing system, the first document to extract first remittance information from the first document; obtaining, using the computing system, one or more historical documents containing historical remittance information; correlating, using the computing system and one or more machine learning algorithms, the one or more historical documents and the first document to determine whether at least one historical document pattern of one or more historical document patterns of the one or more historical documents correlates to the first document; determining, using the computing system, that the at least one historical document pattern of the one or more historical document patterns correlates to the first document; and, based on a determination that the at least one historical document pattern of the one or more document patterns correlates to the first document, extracting, using the computing system, the first remittance information from the first document based on the least one historical document pattern; and/or the like. In this manner, the computing system can perform functions that the computing system could not previously perform. For instance, the computing system can, in real-time, automatically extract remittance information using one or more historical document patterns, map the extracted remittance information to an outstanding invoice, and automatically update or enter data one or more accounts based on the extracted remittance information.

In additional aspects, certain embodiments can improve the functioning of user equipment or systems themselves (e.g., data entry technology, data mapping technology, data extraction technology, data clustering technology, machine learning technology, etc.), for example, by, improving the precision and accuracy of the systems by training the system in a specific business context, document type context, document form context, document pattern context, or document template context, by automatically entering remittance information in real-time, or by training the system based on a user input into the computing system. For example, the system can be trained for extracting and entering remittance information specific to an organization, specific to an industry, specific to a region, specific to a time period, specific to a document type, specific to a document form, specific to a document pattern, specific to a document template, etc. Additionally, in a non-limiting example, the computing system can track user inputs in real time to learn where specific remittance information is located in a document type, form, or template. If the user identifies or selects a location of at least one of an invoice number, a payment amount, a discount amount, a total amount of the invoice, or a date of the invoice, and/or the like, the system will learn from the user selection and the computing system will automatically identify a pattern to use for a similar document to select at least one of an invoice number, a payment amount, a discount amount, a total amount of the invoice, or a date of the invoice, and/or the like in the future without user input. Alternatively, if the user uses a particular data entry of the first document as an invoice number, a payment amount, a discount amount, a total amount of the invoice, or a date of the invoice, and/or the like, the system will learn the location of the data entry, associate the data entry with an invoice number, a payment amount, a discount amount, a total amount of the invoice, or a date of the invoice, and/or the like, and automatically identify a pattern to use for a similar document to select at least one of an invoice number, a payment amount, a discount amount, a total amount of the invoice, or a date of the invoice, and/or the like in the future without user input. In this manner, the computing system can perform functions that the computing system could not previously perform. For instance, the computing system automatically and in real-time identify, extract, and enter remittance information, machine learning algorithms can be automatically implemented to identify, extract, and enter remittance information, historical documents can be automatically organized and clustered together to identify, extract, and enter remittance information, machine learning algorithms can be automatically trained or updated based on tracking user actions, and/or the like.

In particular, to the extent any abstract concepts are present in the various embodiments, those concepts can be implemented as described herein by devices, software, systems, and methods that involve specific novel functionality (e.g., steps or operations), such as, providing real-time feedback and data extraction associated with one or more first documents as the one or more first documents are received by a computing system. For instance, the following steps may be performed in real-time as one or more first documents are received: analyzing, using the computing system, the first document to extract first remittance information from the first document; obtaining, using the computing system, one or more historical documents containing historical remittance information; correlating, using the computing system and one or more machine learning algorithms, the one or more historical documents and the first document to determine whether at least one historical document pattern of one or more historical document patterns of the one or more historical documents correlates to the first document; determining, using the computing system, that the at least one historical document pattern of the one or more document patterns correlates to the first document; and, based on a determination that the at least one historical document pattern of the one or more historical document patterns correlates to the first document, extracting, using the computing system, the first remittance information from the first document based on the least one historical document pattern; and/or the like. These particular steps, to name a few examples, extend beyond mere conventional computer processing operations. These functionalities can produce tangible results outside of the implementing computer system, including, merely by way of example, real-time feedback and identification of remittance data from a first document, improved accuracy, precision, and processing speed of computing systems using machine learning algorithms based on mapping of remittance data in one or more historical documents, and/or the like, at least some of which may be observed or measured by users of the computing system, customers, and/or companies.

In an aspect, a method might comprise receiving, using a computing system, a first document containing first remittance information and analyzing, using the computing system, the first document to extract the first remittance information from the first document. In some cases, analyzing the first document to extract the first remittance information from the first document might include obtaining, using the computing system, one or more historical documents containing historical remittance information and correlating, using the computing system and one or more machine learning algorithms, the first document to the one or more historical documents to determine whether at least one historical document pattern of one or more historical document patterns of the one or more historical documents correlates to the first document. Next, the method may include determining, using the computing system, that at least one first historical document pattern of the one or more historical document patterns correlates to the first document. Based on a determination that the at least one first historical document pattern of the one or more historical document patterns correlates to the first document, the method might further include extracting, using the computing system, the first remittance information from the first document based on the least one first historical document pattern.

In some embodiments, the first document is at least one of a scanned document, a scanned image, an image file, a portable document format file, a text file, or a spreadsheet file.

According to some embodiments, extracting the first remittance information from the first document based on the least one historical document pattern further comprises: identifying, using the computing system and the at least one first historical document pattern, an invoice associated with the first remittance information of the first document and at least one of a payment amount, a discount amount, a total amount of the invoice, or a date of the invoice associated with the first remittance information of the first document; mapping, using the computing system, the invoice to at least one of the payment amount, the discount amount, the total amount of the invoice, or the date of the invoice; and based on mapping the invoice to at least one of the payment amount, the discount amount, the total amount of the invoice, or the date of the invoice, entering, using the computing system, the payment amount, the discount amount, the total amount of the invoice, or the date of the invoice into at least one of a general ledger, an accounts receivable account, or an accounts payable account.

In some embodiments, extracting the first remittance information from the first document based on the least one first historical document pattern further comprises determining, using the computing system, one or more historical fields in the at least one first historical document pattern; mapping, using the computing system, one or more first fields in the first document based on the one or more historical fields in the at least one first historical document pattern; and based on the mapping of the one or more first fields, extracting, using the computing system, the first remittance information from the first document.

In some cases, at least one of the one or more historical fields or the one or more first fields might include, without limitation, at least one of a customer field, a vendor field, an invoice number field, an invoice amount field, a payment field, a date field, a transaction type field, a credit number field, a debit number field, a check number field, an account number field, a discount amount field, or a reference number field, and/or the like.

According to some embodiments, the first remittance information might include, without limitation, at least one of a customer associated with the first document, a vendor associated with the first document, an invoice number associated with the first document, an invoice amount associated with the first document, an invoice date associated with the first document, a payment associated with the first document, a payment date associated with the first document, a discount amount associated with the first document, a credit number associated with the first document, a debit number associated with the first document, a check number associated with the first document, or an account number associated with the first document, and/or the like.

In some embodiments, the method might further include analyzing, using the computing system, the first document to extract first remittance information from the first document occurs in real-time after the first document has been received.

According to some embodiments, correlating the first document to the one or more historical documents to determine whether at least one historical document pattern of the one or more historical document patterns correlates to the first document further comprises generating, using the computing system, one or more historical vectors associated with the one or more historical document patterns; clustering, using the computing system, the one or more historical vectors into one or more document clusters based on a first similarity between the one or more historical vectors; generating, using the computing system, a first vector associated with the first document; correlating, using the computing system, the first vector with the one or more document clusters to determine a second similarity between the first vector and the one or more historical document clusters; and based on a second similarity between the first vector and the one or more document clusters, determining, using the computing system, that the first document correlates to the at least one first historical document pattern contained within at least one of the one or more historical document clusters.

In various instances, generating the one or more historical vectors associated with the one or more historical document patterns comprises generating the one or more historical vectors based on at least one of one or more historical scanned copies of the one or more historical document patterns or one or more historical images of the one or more historical document patterns. Additionally, in some instances, generating the first vector associated with the first document comprises generating the first vector based on at least one of one or more first scanned copies of the first document or one or more first images of the first document.

In some embodiments, the first similarity between the one or more historical vectors is based on one or more historical positions of one or more historical keywords located in the one or more historical document patterns and the second similarity between the one or more historical document clusters and the first vector is based on a comparison of one or more first positions of one or more first keywords of the first document with the one or more historical positions of the one or more historical keywords located in a corresponding historical document cluster.

In some instances, the method might additionally include receiving, using the computing system, a second document containing second remittance information and analyzing, using the computing system, the second document to extract the second remittance information from the second document. Analyzing the second document to extract the second remittance information from the second document might include obtaining, using the computing system, the one or more historical documents containing the historical remittance information and correlating, using the computing system and the one or more machine learning algorithms, the second document to the one or more historical documents to determine whether at least one second historical document pattern of the one or more historical document patterns correlates to the second document. Next, the method might continue by determining, using the computing system, that no historical document patterns correlate to the second document. Based on a determination that no historical document patterns correlate to the second document, the method might include flagging, using the computing system, the second document for review.

In various embodiments, the method might include automatically reviewing, using the computing system, the second document. Reviewing the second document might comprise performing, using the computing system, text recognition on the second document to determine one or more second fields of the second document and, based on the determined one or more second fields, extracting the second remittance information from the second document. The computing system might use the text recognition to determine one or more key words associated with the one or more second fields. The one or more key words might include at least one of one or more names, one or more invoice labels or terms, one or more amount labels or terms, one or more payment or transaction types, one or more date labels or terms, one or more payment labels or terms, one or more account labels or terms, one or more account number labels or terms, or one or more check labels or terms, and/or the like. The computing system might additionally retrain the one or more machine learning algorithms based on the second document.

In some cases, the method might further include sending, using the computing system, the second document to a user to review; tracking, using the computing system, at least one or more user movements on a user interface of the computing system or one or more user extractions from the second document to extract one or more second fields of the second document; and, based on the extracted one or more second fields, extracting the second remittance information from the second document.

Tracking the one or more user movements or the one or more user extractions might include tracking, using the computing system, the one or more user movements or the one or more user extractions to determine a location in the second document of the one or more second fields; and correlating, using the computing system, each second field of the one or more second fields to a corresponding location in the second document. Based on a correlation of each second field of the one or more second fields to the corresponding location in the second document, the method might comprise retraining, using the computing system, the one or more machine learning algorithms based on the second document.

In another aspect, a computing system might include at least one processor communicatively coupled to the one or more antennas; and a non-transitory computer readable medium communicatively coupled to the at least one processor. The non-transitory computer readable medium might have stored thereon computer software comprising a set of instructions that, when executed by the at least one processor, causes the apparatus to: receive a first document containing first remittance information and analyze the first document to extract the first remittance information from the first document. In some cases, analyzing the first document to extract the first remittance information from the first document might cause the computing system to obtain one or more historical documents containing historical remittance information and correlate, using one or more machine learning algorithms, the first document to the one or more historical documents to determine whether at least one historical document pattern of one or more historical document patterns of the one or more historical documents correlates to the first document. Next, the computing system may determine that at least one first historical document pattern of the one or more historical document patterns correlates to the first document. Based on a determination that the at least one first historical document pattern of the one or more historical document patterns correlates to the first document, the instructions might cause the computing system to extract the first remittance information from the first document based on the least one first historical document pattern.

In yet another aspect, a non-transitory computer readable medium might have stored thereon computer software comprising a first set of instructions that, when executed by a processor, causes the processor to: receive a first document containing first remittance information and analyze the first document to extract the first remittance information from the first document. In some cases, analyzing the first document to extract the first remittance information from the first document might cause the computing system to obtain one or more historical documents containing historical remittance information and correlate, using one or more machine learning algorithms, the first document to the one or more historical documents to determine whether at least one historical document pattern of one or more historical document patterns of the one or more historical documents correlates to the first document. Next, the processor may determine that at least one first historical document pattern of the one or more historical document patterns correlates to the first document. Based on a determination that the at least one first historical document pattern of the one or more historical document patterns correlates to the first document, the instructions might cause the processor to extract the first remittance information from the first document based on the least one first historical document pattern.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing automatic document pattern recognition and analysis, and, more particularly, for implementing automatic document pattern recognition and analysis to reduce identification time, extraction time, and handling time of remittance information, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing automatic document pattern recognition and analysis to reduce identification time, extraction time, entry time, and handling time of remittance information, in accordance with various embodiments. Although lines are used to denote communicative couplings and/or connections (e.g., wireless and/or wired connections) between devices, one or more intermediary devices (not shown) and/or networks (not shown) may be located between the one or more devices of FIG. 1.

In the non-limiting embodiment of FIG. 1, system 100 might comprise a first computing system(s) 105 and one or more corresponding database(s) 110a-110n (collectively, databases(s) 110) communicatively coupled to first computing system(s) 105. In some embodiments, system 100 might further include one or more second computing system(s) 115, one or more network(s) 120, and/or the like. Although the database(s) 110 and the one or more second computing systems 115 are shown to be external to the first computing system 105, the various embodiments are not so limited and the database(s) 110 and the one or more second computing systems 115 might be disposed within the first computing system 105. In some cases, the database(s) 110 and/or second computing system 115 may be located within the same network or customer premises as the first computing system 105. Alternatively, the database(s) 110 and/or second computing system 115 may be remote from and/or located within a different network or customer premises than the first computing system 105.

In some embodiments, the first computing system 105 and/or the second computing system 115 might include, without limitation, a first processor (not shown) and a first memory (not shown). In some embodiments, the first computing system 105 and/or the second computing system 115 may include, without limitation, one or more of a user device, a server computer, a server computer over a network, a cloud-based computing system, a cloud-based computing system over a network, or a distributed computing system, and/or the like. In some cases, the first computing system 105 and/or the second computing system 115 may be, without limitation, at least one of a server computer, a desktop computer, a laptop computer, a tablet computer, a smart phone, a cellphone, a mobile phone, a personal digital assistant, or any suitable device capable of communicating via a web-based portal, an application programming interface ("API"), a server, a software application ("app"), or any other suitable communications interface, or the like.

System 100 might further comprise network(s) 120, which might communicatively couple at least one of the first computing system(s) 105, the database(s) 110, and/or the second computing system 115, and/or the like. The network(s) 120 might be service provider networks, content provider networks, local area networks, and/or the like. Network(s) might include, without limitation, one of a fiber network, an Ethernet network, a Token-Ring™ network, a wide-area network ("WAN"), a wireless wide area network ("WWAN"), a virtual private network ("VPN"), the Internet, an intranet, an extranet, a public switched telephone network ("PSTN"), an infra-red network, a wireless network operating under any of the IEEE 802.11 suite of protocols, the Bluetooth™ protocol known in the art, the Z-Wave protocol known in the art, the ZigBee protocol or other IEEE 802.15.4 suite of protocols known in the art, and/or any other wireless protocol, and/or any combination of these and/or other networks In operation, the first computing system(s) 105 and/or the second computing system(s) 115 might receive one or more first documents containing first remittance information. The one or more first documents might include, without limitation, one or more scanned documents, one or more scanned images, one or more image files (e.g., one or more Joint Photographic Experts Group ("JPEG") files, one or more Portable Network Graphics ("PNG"), one or more Graphics Interchange Format files, etc.), one or more Portable Document Format ("PDF") files, one or more text files (e.g., one or more Word files, one or more Notepad files, etc.), or one or more spreadsheet files (e.g., one or more Excel files), and/or the like.

The remittance information contained within the first document might include, without limitation, at least one of a customer associated with the first document, a vendor associated with the first document, an invoice number associated with the first document, an invoice amount associated with the first document, an invoice date associated with the first document, a payment associated with the first document, a payment date associated with the first document, a credit number associated with the first document, a debit number associated with the first document, a check number associated with the first document, or an account number associated with the first document, and/or the like. In some cases, the first document might represent a payment for an invoice, an invoice from a vendor, a receipt for a payment, and/or the like.

Next, the first computing system(s) 105 and/or the second computing system(s) 115 might analyze the first document to extract first remittance information from the first document. In order to analyze the first document to extract the first remittance information from the first document, the first computing system(s) 105 and/or the second computing system(s) 115 may obtain one or more historical documents containing historical remittance information. The historical documents might be stored in at least one of the first computing system(s) 105, the one or more databases 110, and/or the second computing system(s) 115. In some instances, the one or more databases 110 might be one or more company databases storing one or more documents associated with accounts receivable data, accounts payable data, balance sheet data, company transaction data, general ledger data, and/or the like and/or one or more third-party databases storing one or more documents associated with third party data (e.g., bank data, customer data, vendor data, website interaction data, credit card data, debit card data, receipt data, payment data, etc.), and/or one the like.

The historical documents might be, without limitation, one or more scanned documents, one or more scanned images, one or more image files (e.g., one or more Joint Photographic Experts Group ("JPEG") files, one or more Portable Network Graphics ("PNG"), one or more Graphics Interchange Format files, etc.), one or more Portable Document Format ("PDF") files, one or more text files (e.g., one or more Word files, one or more Notepad files, etc.), or one or more spreadsheet files (e.g., one or more Excel files), and/or the like. In some cases, the one or more historical documents might represent a payment for an invoice, an invoice from a vendor, a receipt for a payment, and/or the like. In some cases, the one or more historical documents might be one or more historical document types (e.g., an invoice, an invoice from a vendor, a receipt for a payment, and/or the like), one or more document templates (e.g., an invoice template, a receipt template, and/or the like), one or more document forms (e.g., an invoice form, a receipt form, and/or the like).

The historical remittance information contained in the one or more historical documents might include, without limitation, at least one of a customer associated with the one or more historical documents, a vendor associated with the one or more historical documents, an invoice number associated with the one or more historical documents, an invoice amount associated with the one or more historical documents, an invoice date associated with the one or more historical documents, a payment associated with the one or more historical documents, a payment date associated with the one or more historical documents, a credit number associated with the one or more historical documents, a debit number associated with the one or more historical documents, a check number associated with the one or more historical documents, or an account number associated with the one or more historical documents, and/or the like. In some instances, the one or more historical documents might contain one or more patterns of historical remittance information, one or more particular ways historical remittance information is arranged, or a particular order of historical remittance information, and/or the like.

Additionally, in order to analyze the first document to extract first remittance information from the first document, the first computing system(s) 105 and/or the second computing system(s) 115 might correlate the one or more historical documents and the first document to determine whether at least one historical document pattern of one or more historical document patterns of the one or more historical documents correlates to the first document. This correlation step might be performed using one or more machine learning algorithms that are trained based on the historical documents and/or the historical document patterns to extract the first remittance information from the one or more historical documents and/or historical document patterns. This analysis step may occur in real-time as the first document is received by the first computing system(s) 105 and/or the second computing system(s) 115.

In some embodiments, based on the correlation between the one or more historical document patterns and the first document, the first computing system(s) 105 and/or the second computing system(s) 115 might determine that at least one historical document pattern of the one or more document patterns correlates to the first document. In other words, the first document might be correlated to at least one historical document pattern that is most similar to (e.g., contains remittance information in similar locations as) the first document. In various instances, based on a determination that the at least one historical document pattern of the one or more historical document patterns correlates to the first document the first computing system(s) 105 and/or the second computing system(s) 115 might extract the first remittance information from the first document based on the least one historical document pattern.

In various cases, the extracted remittance information may be mapped to an invoice of a company and/or entered into a general ledger, a balance sheet, an income statement, a cash flow statement, general ledger line items, accounts receivable statements, accounts payable statements, and/or the like stored on the first computing system(s) 105, the one or more databases 110, and/or the second computing system(s) 115. In this manner, remittance data entry associated with the one or more first documents may be conducted automatically in real-time without user input.

These and other functions of the system 100 (and its components) are described in greater detail below with respect to FIGS. 2-6.

FIGS. 2A-2E (collectively, FIG. 2) are flow diagrams illustrating a method 200 for implementing automatic document pattern recognition to reduce identification time, extraction time, and handling time of remittance information, in accordance with various embodiments. While the techniques and procedures are depicted and/or described in a certain order for purposes of illustration, it should be appreciated that certain procedures may be reordered and/or omitted within the scope of various embodiments. Moreover, while the method 200 illustrated by FIG. 2 can be implemented by or with (and, in some cases, are described below with respect to) the systems, examples, or embodiments 100, 300, and 400 of FIGS. 1, 3, and 4, respectively (or components thereof), such methods may also be implemented using any suitable hardware (or software) implementation. Similarly, while each of the systems, examples, or embodiments 100, 300, and 400 of FIGS. 1, 3, and 4, respectively (or components thereof), can operate according to the method 200 illustrated by FIG. 2 (e.g., by executing instructions embodied on a computer readable medium), the systems, examples, or embodiments 100 and 200 of FIGS. 1 and 2 can each also operate according to other modes of operation and/or perform other suitable procedures.

In the non-limiting embodiment of FIG. 2, method 200, may comprise, at block 202, receiving, using a computing system, one or more first documents containing first remittance information. In some embodiments, the computing system might include, without limitation, a first processor and a first memory. In some embodiments, the computing system may include, without limitation, one of a user device, a server computer, a server computer over a network, a cloud-based computing system, a cloud-based computing system over a network, or a distributed computing system, and/or the like.

The one or more first documents might include, without limitation, one or more scanned documents, one or more scanned images, one or more image files (e.g., one or more Joint Photographic Experts Group ("JPEG") files, one or more Portable Network Graphics ("PNG"), one or more Graphics Interchange Format files, etc.), one or more Portable Document Format ("PDF") files, one or more text files (e.g., one or more Word files, one or more Notepad files, etc.), or one or more spreadsheet files (e.g., one or more Excel files), and/or the like. In some cases, the one or more first documents may be received in the mail and scanned into the computing system. Alternatively, the one or more first documents may be received as an attachment to an email. In some cases, the one or more first documents might be a company invoice, a payment for an invoice, an invoice from a vendor, a receipt for a payment, a check from a customer, and/or the like.

The remittance information contained within the one or more first documents might include, without limitation, at least one of a customer associated with the one or more first documents, a vendor associated with the one or more first documents, an invoice number associated with the one or more first documents, an invoice amount associated with the one or more first documents, an invoice date associated with the one or more first documents, a payment associated with the one or more first documents, a payment date associated with the one or more first documents, a credit number associated with the one or more first documents, a debit number associated with the one or more first documents, a check number associated with the one or more first documents, or an account number associated with the one or more first documents, and/or the like. Examples of remittance information are shown in example documents 300a and 300b of FIG. 3.

In some cases, the one or more first documents might contain one or more fields, headers, key words, and/or key numbers identifying specific types of remittance information contained within the one or more first documents (shown in FIG. 3). The one or more fields, headers, key words, and/or key numbers might include, without limitation, at least one of one or more names (e.g., customer name, vendor name, company name, etc.), one or more invoice labels or terms, one or more amount labels or terms, one or more payment or transaction types, one or more date labels or terms, one or more payment labels or terms, one or more account labels or terms, one or more account number labels or terms, or one or more check labels or terms, and/or the like. For example, the one or more fields, headers, key words, and/or key numbers might include, without limitation, "amount billed" identifying the amount billed for an invoice or a transaction, "payment amount" identifying an amount paid, "invoice number" identifying an invoice number, "customer number" identifying a customer number or customer account number, "date" identifying a date, "discount" identifying an amount or a percentage of a discount, "from" identifying a source of the remittance information, "to" identifying a recipient of the remittance information, etc. Examples of fields, headers, key words, and/or key numbers are shown in example documents 300a and 300b of FIG. 3.

Additionally or alternatively, in some cases, the one or more first documents might contain specific remittance information and/or fields, headers, key words, and/or key numbers located in specific positions, patterns, and/or locations (e.g., top-left, top-right, top-center, middle-left, middle-right, middle, bottom-left, bottom-right, bottom-center, etc.) of the one or more first documents. Examples of specific remittance information and/or fields, headers, key words, and/or key numbers located in specific positions, patterns, and/or locations are shown in example documents 300*a* and 300*b* of FIG. 3.

In some cases, method 200, at optional block 204 might include, without limitation, identifying, with the computing system, that the one or more first documents contain remittance information. This identification step may be performed by analyzing, with the computing system, a subject line of the one or more first documents, a body of the one or more first documents, a subject line of an email containing the one or more first documents, or a body of an email containing the one or more first documents, etc. for remittance information (e.g., at least one of a customer associated with the one or more first documents, a vendor associated with the one or more first documents, an invoice number associated with the one or more first documents, an invoice amount associated with the one or more first documents, an invoice date associated with the one or more first documents, a payment associated with the one or more first documents, a payment date associated with the one or more first documents, a credit number associated with the one or more first documents, a debit number associated with the one or more first documents, a check number associated with the one or more first documents, or an account number associated with the one or more first documents, and/or the like).

Alternatively, this identification step 204 may be performed by comparing or correlating, using the computing system and one or more machine learning algorithms, the one or more first documents to one or more historical documents containing historical remittance information to determine a similarity between the one or more first documents and the one or more historical documents. Based on a determined similarity between the one or more first documents and the one or more historical documents containing historical remittance information, the computing system may determine that the one or more first documents contain remittance information. This comparison and/or correlation between the one or more first documents and the one or more historical documents may be similar to the process described in steps 222-230 of the method 200.

Next, at block 206, method 200 may continue by analyzing, using the computing system, the one or more first documents to extract the first remittance information from the one or more first documents. In order to analyze the one or more first documents, the method 200 may continue on to block 208 by obtaining, using the computing system, one or more historical documents containing historical remittance information. The one or more historical documents may be stored in the computing system, in a database associated with the computing system, in the cloud, and/or the like.

The one or more historical documents might include, without limitation, one or more scanned documents, one or more scanned images, one or more image files (e.g., one or more Joint Photographic Experts Group ("JPEG") files, one or more Portable Network Graphics ("PNG"), one or more Graphics Interchange Format files, etc.), one or more Portable Document Format ("PDF") files, one or more text files (e.g., one or more Word files, one or more Notepad files, etc.), or one or more spreadsheet files (e.g., one or more Excel files), and/or the like. In some cases, the one or more historical documents might represent an invoice for a company, a payment for an invoice, an invoice from a vendor, a receipt for a payment, a check from a customer, and/or the like.

The remittance information contained within the one or more historical documents might include, without limitation, at least one of a customer associated with the one or more historical documents, a vendor associated with the one or more historical documents, an invoice number associated with the one or more historical documents, an invoice amount associated with the one or more historical documents, an invoice date associated with the one or more historical documents, a payment associated with the one or more historical documents, a payment date associated with the one or more historical documents, a credit number associated with the one or more historical documents, a debit number associated with the one or more historical documents, a check number associated with the one or more historical documents, an address associated with the one or more historical documents, or an account number associated with the one or more historical documents, and/or the like. In some instances, the one or more historical documents might contain one or more patterns of historical remittance information, one or more particular ways historical remittance information is arranged, or a particular order of historical remittance information, and/or the like. Examples of remittance information are shown in example documents 300*a* and 300*b* of FIG. 3.

In some cases, the one or more historical documents might contain one or more fields, headers, key words, and/or key numbers identifying specific types of remittance information contained within the historical documents. The one or more fields, headers, key words, and/or key numbers might include, without limitation, at least one of one or more names (e.g., customer name, vendor name, company name, etc.), one or more invoice labels or terms, one or more amount labels or terms, one or more payment or transaction types, one or more date labels or terms, one or more payment labels or terms, one or more account labels or terms, one or more account number labels or terms, or one or more check labels or terms, and/or the like. For example, the one or more fields, headers, key words, and/or key numbers might include, without limitation, "amount billed" identifying the amount billed for an invoice or a transaction, "payment amount" identifying an amount paid, "invoice number" identifying an invoice number, "customer number" identifying a customer number or customer account number, "date" identifying a date, "discount" identifying an amount or a percentage of a discount, "from" identifying a source of the remittance information, "to" identifying a recipient of the remittance information, etc. Examples of fields, headers, key words, and/or key numbers is shown in example documents 300*a* and 300*b* of FIG. 3.

Additionally or alternatively, in some cases, the one or more historical documents might contain specific remittance information and/or fields, headers, key words, and/or key numbers located in specific positions, patterns, and/or locations (e.g., top-left, top-right, top-center, middle-left, middle-right, middle, bottom-left, bottom-right, bottom-center, etc.) of the one or more historical documents. Examples of specific remittance information and/or fields, headers, key words, and/or key numbers located in specific positions, patterns, and/or locations are shown in example documents 300*a* and 300*b* of FIG. 3.

The one or more locations, positions, patterns, fields, headers, key words, and/or key numbers may correspond to, without limitation, a customer location, position, pattern, field, header, key word, and/or key number, a vendor location, position, pattern, field, header, key word, and/or key number, an invoice number location, position, field, header, key word, and/or key number, an invoice amount location, position, pattern, field, header, key word, and/or key number, a payment location, position, pattern, field, header, key word, and/or key number, a date location, position, field, header, key word, and/or key number, a transaction type location, position, pattern, field, header, key word, and/or key number, a credit number location, position, pattern, field, header, key word, and/or key number, a debit number location, position, pattern, field, header, key word, and/or key number, a check number location, position, pattern, field, header, key word, and/or key number, an account number location, position, pattern, field, header, key word, and/or key number, a discount amount location, position, pattern, field, header, key word, and/or key number, or a reference number location, position, pattern, field, header, key word, and/or key number, and/or the like. In a non-limiting example, a company name under a header "from" may be located in a top left corner of a historical document, a check number under a header "check no." may be located in a top right corner of a historical document, etc.

In some cases, each historical document has already been analyzed automatically by the computing system and/or manually a user or an analyst to determine locations, positions, patterns, fields, headers, key words, and/or key numbers of remittance information contained within the one or more historical documents and/or to determine locations, patterns, or positions of fields, headers, key words, and/or key numbers of remittance information contained within the one or more historical documents. Based on this analysis by the computing system and/or the user or the analyst, one or more machine learning algorithms may learn or be trained to learn locations, positions, patterns, fields, headers, key words, and/or key numbers of remittance information contained within the one or more historical documents to extract remittance information from the one or more first documents. The one or more machine learning algorithms may learn or be trained based on the method described in blocks 258-278 of method 200.

In some cases, in order to analyze the one or more first documents, the method 200 might, at optional block 210, cluster, with the computing system, the one or more historical documents into one or more document clusters or one or more historical document clusters based on a first similarity between the one or more historical documents and/or a first similarity between one or more historical document patterns. A document pattern, a historical document pattern, a pattern, and/or historical pattern refer to a pattern or an arrangement of information contained within the one or more historical documents and documents with similar patterns or arrangements may be grouped together in one or more document clusters or one or more historical document clusters. This clustering step 210 may occur before or during the analysis step 206.

Figure 2A:
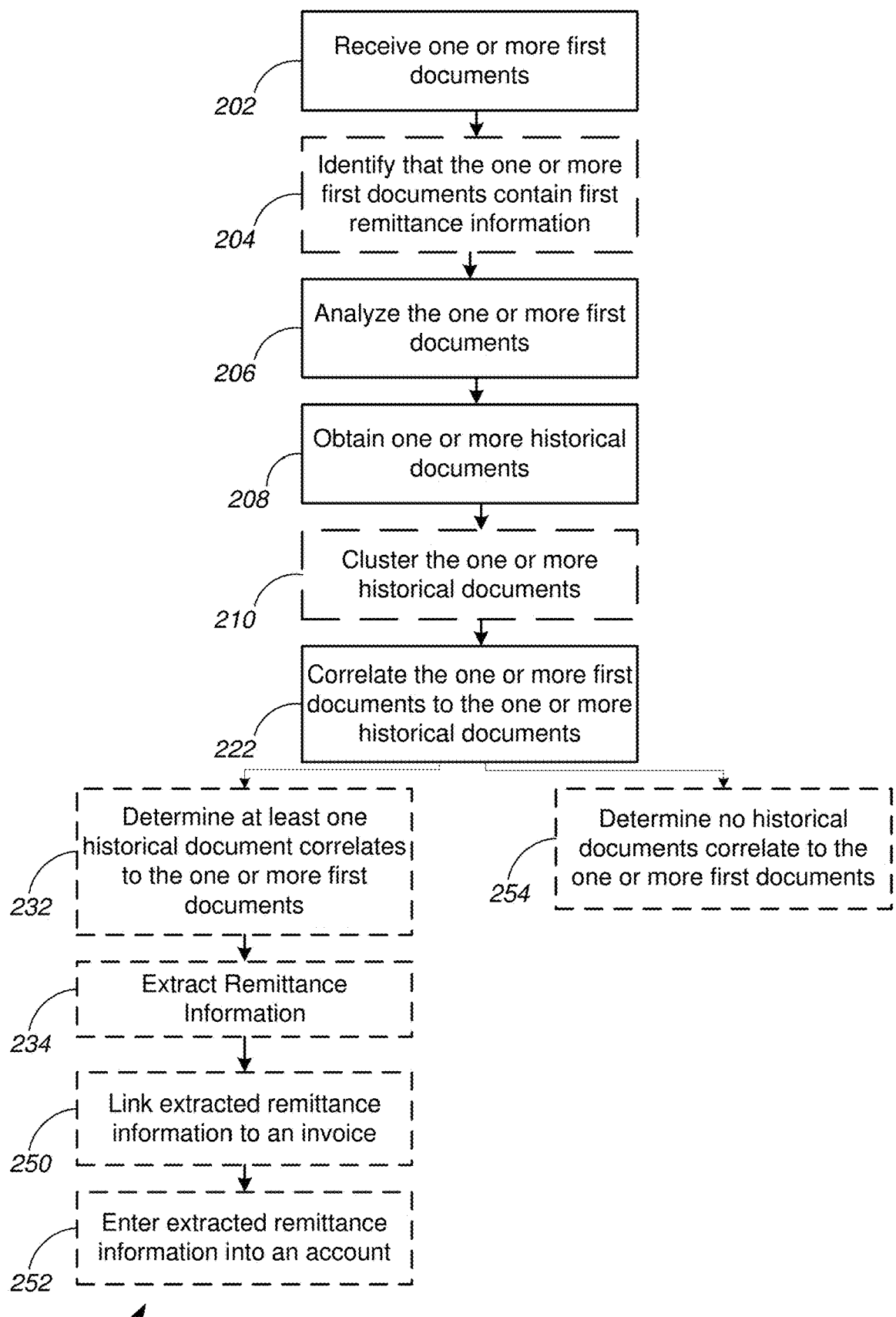
FIGS. 2A-2E are flow diagrams illustrating a method for implementing automatic document pattern recognition and analysis to reduce identification time, extraction time, and handling time of remittance information, in accordance with various embodiments.
Figure 2B:
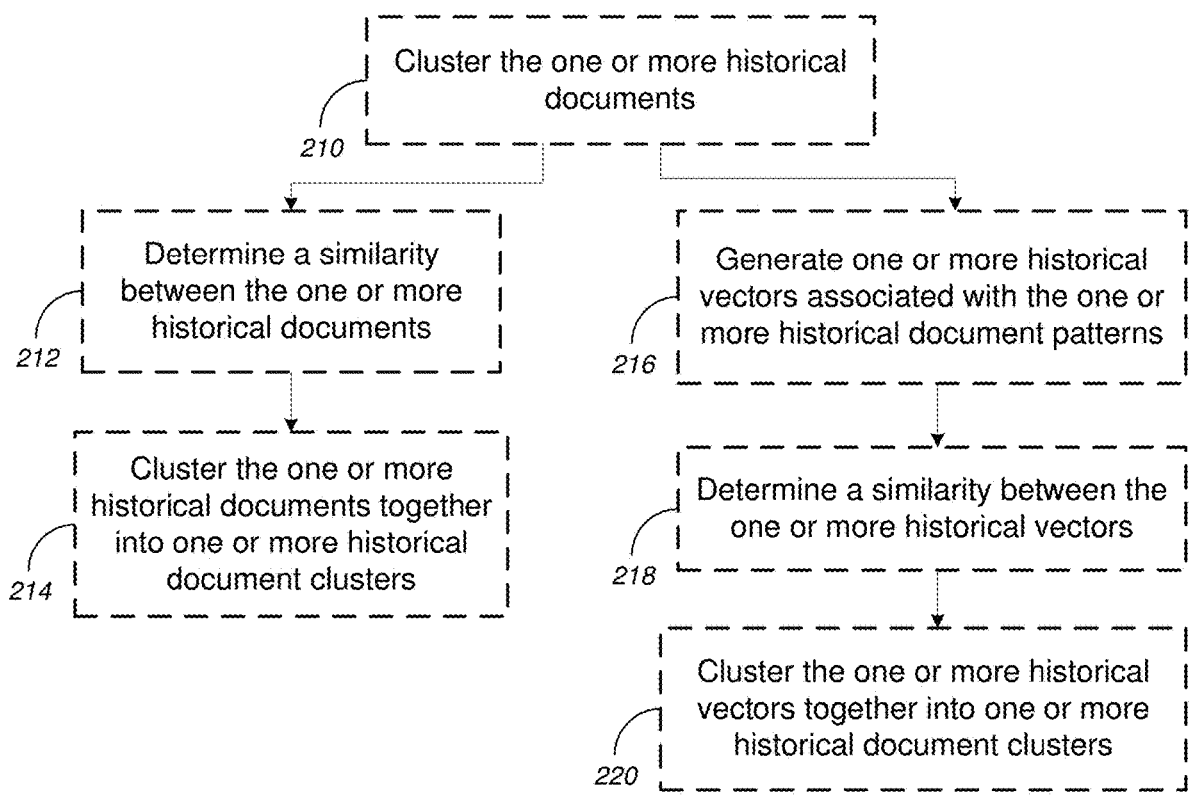

In order to cluster the one or more historical documents, the method 200 might continue onto optional block 212 in FIG. 2B or optional block 216 of FIG. 2B.

The method 200, at optional block 212, might comprise determining, using the computing system, a similarity between the one or more historical documents. The similarity of the one or more historical documents may be determined based on a comparison of locations, positions, patterns, fields, headers, key words, key numbers, and/or images of remittance information contained within the one or more historical documents, a comparison of portions of locations, positions, patterns, fields, headers, key words, key numbers, and/or images of remittance information contained within the one or more historical documents, a comparison of locations, patterns, or positions of fields, headers, key words, key numbers, and/or images contained within the one or more historical documents, and/or a comparison of locations, patterns, or positions of portions of fields, headers, key words, key numbers, and/or images contained within the one or more historical documents, and/or the like.

The similarity between the one or more historical documents may be determined based on a determination of the overlapping and/or based on a calculation of a percentage of the overlapping locations, positions, patterns, fields, headers, key words, key numbers, and/or images of remittance information contained within the one or more historical documents. In some cases, text recognition software may be used to determine overlapping information, fields, headers, key words, key numbers, and/or images contained within the one or more historical documents.

Additionally and/or alternatively, in various embodiments, the computing system may only compare information (e.g., locations, positions, patterns, fields, headers, key words, and/or images) that is likely to overlap between historical documents and ignore information that is less likely to overlap (e.g., numbers, customer names, etc.). In a non-limiting example, headers or fields such as "amount paid," "to," "from," may be more likely to appear consistently across one or more historical documents while payment amounts (e.g., $100, $200, etc.) might differ between historical documents.

The method 200, at optional block 214, might comprise clustering, using the computing system, the one or more historical documents into one or more historical document clusters based on the similarity between the one or more historical documents. Each historical document cluster of the one or more historical document clusters may have one or more historical documents or historical patterns having a threshold degree of similarity based on a comparison of locations, positions, patterns, fields, headers, key words, key numbers, and/or images of remittance information contained within the one or more historical documents, a comparison of portions of locations, positions, patterns, fields, headers, key words, key numbers, and/or images of remittance information contained within the one or more historical documents, a comparison of locations, patterns, or positions of fields, headers, key words, key numbers, and/or images of remittance information contained within the one or more historical documents, and/or a comparison of locations, patterns, or positions of portions of locations, positions, patterns, fields, headers, key words, key numbers, and/or images of remittance information contained within the one or more historical documents, and/or the like.

In a non-limiting example, if the computing system determines the similarity between two historical documents is greater than a percentage (e.g., 70%, 80%, 90%, 95%, 98%, 99%, etc.), then the two historical documents may be clustered together in a first historical document cluster. If the computing system determines that the similarity between the two historical documents is less than a percentage (e.g., 70%, 80%, 90%, 95%, 98%, 99%, etc.), the two historical documents may be clustered into different historical document clusters. This percentage may be determined based on a direct comparison of one historical document or pattern of a historical document to another historical document or pattern of another historical document, based on a comparison of a portion of one historical document or pattern of a historical document to a corresponding portion of another historical document or pattern of another historical document, based on a comparison of fields, headers, key words, key numbers, and/or images of one historical document or pattern of a historical document to corresponding fields, headers, key words, key numbers, and/or images of another historical document or pattern of another historical document, and/or the like.

Each document or pattern within a historical document cluster or document pattern cluster may have some degree of deviation from other documents or patterns within the historical document cluster. In a non-limiting example, a different payment amount (e.g., $100, $120, etc.) may result in certain degree of deviation between documents or patterns in a document cluster. However, as long as the degree of deviation is less than a particular threshold (e.g., 10%) and the similarity is above a particular threshold (e.g., 90%), then one or more historical documents may still be grouped together in a historical document cluster.

In some cases, in order to determine a similarity between historical documents or patterns of historical documents and a corresponding document cluster, a computing system may utilize or analyze a particular location of a remittance document (e.g., top-left, top-right, top-center, middle-left, middle-right, middle, bottom-left, bottom-right, bottom-center, etc.) where same or similar information, fields, headers, key words, key numbers, and/or images typically appear to cluster together similar historical documents or similar historical patterns. For example, if a company name and account number always appear in a top-left portion of a remittance document (as shown in FIG. 3), then the similarity between the top-left portion of two or more historical documents or historical document patterns may be used to group or cluster the one or more historical documents or historical document patterns together. Additionally or alternatively, in order to determine a similarity between historical documents or historical document patterns and a corresponding historical document cluster, a computing system may utilize or analyze one or more fields, headers, key words, key numbers (e.g., a particular company name, company address, customer name, customer number, vendor name, vendor number, account number, etc.) associated with a particular remittance document and group historical documents together with similar fields, headers, key words, and/or key numbers. For example, if an account number (as shown in FIG. 3) is always associated with a particular type of remittance document, then a similarity between account numbers may be used to group one or more similar historical documents together. A person of ordinary skill in the art would understand that these examples are non-limiting and the computing system could use one or more of these examples to determine or calculate a similarity between the one or more historical documents.

Alternatively, in order to cluster the one or more historical documents, the method 200 might continue onto optional block 216 and comprise generating, using the computing system, one or more historical vectors associated with one or more historical documents and/or historical document patterns. The one or more historical vectors may be generated based on or correspond to information, fields, headers, key words, key numbers, and/or images contained within the one or more historical documents, portions of information, fields, headers, key words, key numbers, and/or images contained within the one or more historical documents, locations, patterns, or positions of information, fields, headers, key words, key numbers, and/or images contained within the one or more historical documents, or locations, patterns, or positions of information, fields, headers, key words, key numbers, and/or images contained within the one or more historical documents, and/or the like.

Figure 3A:
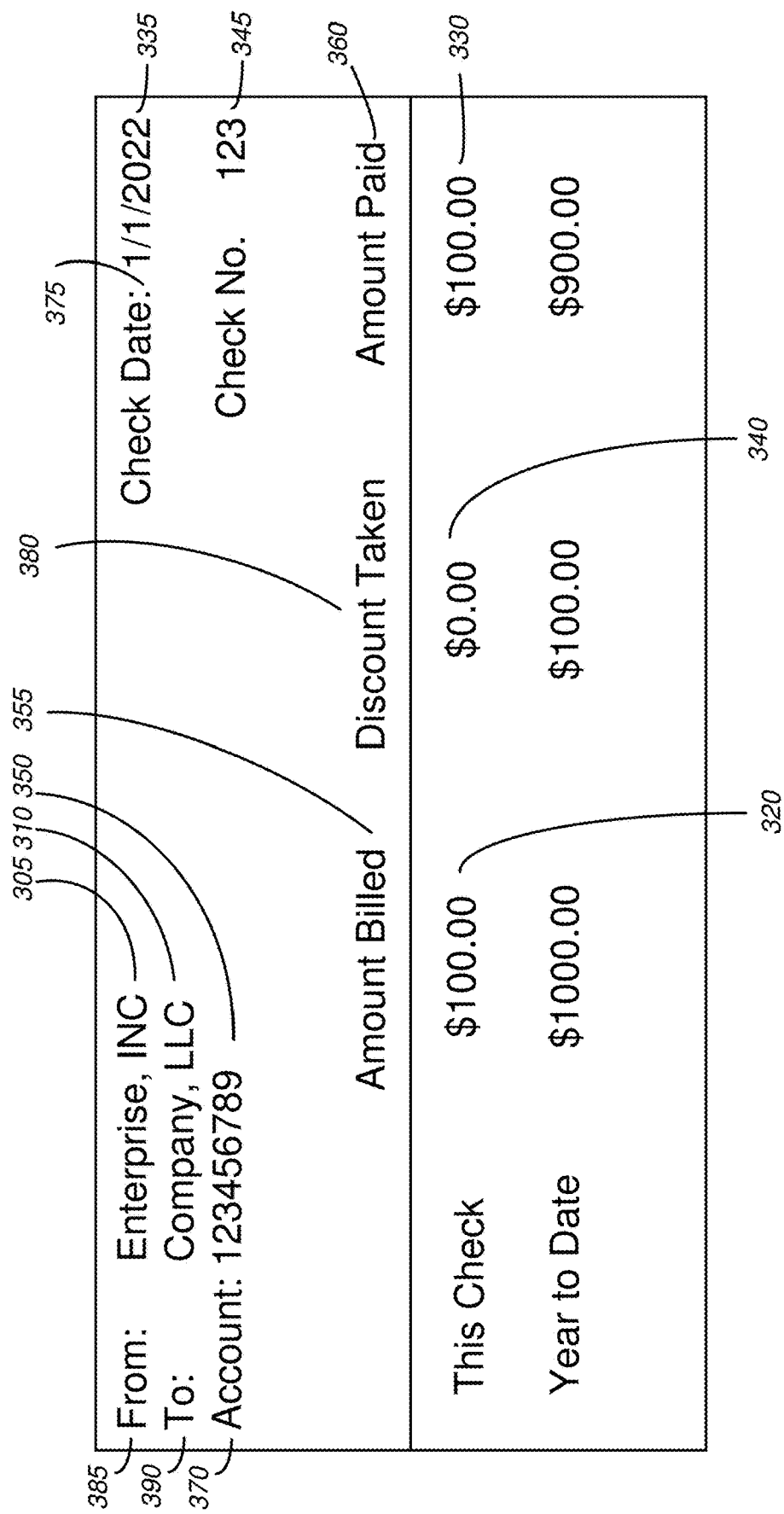

In a non-limiting example, a historical document may be a company check for a particular company (as shown in FIG. 3A) and a particular historical vector may be generated based on the company check for the particular company. In this way, other similar historical documents containing company checks for the particular company may generate a same or similar vector and be clustered together (as shown in FIG. 4) based on the image of the check or a portion of an image of the check for the particular company. Alternatively, in another non-limiting example, a computing system may determine one or more fields, headers, key words, and/or key numbers contained within the one or more historical documents (e.g., a particular company name, company address, customer name, customer number, vendor name, vendor number, account number, etc.) associated with a particular historical document and generate one or more vectors based on the particular field, header, key word, and/or key number. For example, if an account number is always associated with a particular type of remittance document, then the account number may be used to generate the one or more historical vectors and group one or more similar historical documents together in a historical document cluster. Alternatively, in yet another non-limiting example, a computing system may utilize or analyze a particular location or pattern of a remittance document (e.g., top-left, top-right, middle, bottom-left, bottom-right, etc.) where same or similar fields, headers, key words, and/or key numbers typically appear to generate one or more vectors and to cluster together similar historical documents. For example, if a company name and account number always appear in a top-left portion of a historical document, then the top-left portion of the historical document may be used to generate the one or more historical vectors and group one or more historical documents together in a historical document cluster.

In some embodiments, once the one or more historical vectors associated with the one or more historical documents have been generated, the method 200 might continue on to block 218 by determining, using the computing system, a similarity between the one or more historical vectors. Based on the similarity between the one or more historical vectors, method 200, at optional block 220, might include clustering, using the computing system, the one or more historical vectors into one or more historical document clusters based on the similarity between the one or more historical vectors.

Each historical document cluster of the one or more historical document clusters may have one or more historical vectors having a threshold degree of similarity. In a non-limiting example, if the computing system determines the similarity between two historical vectors is greater than a percentage (e.g., 70%, 80%, 90%, 95%, 98%, 99%, etc.), then the two historical vectors may be clustered together in a first historical document cluster. If the computing system determines that the similarity between the two historical vectors is less than a percentage (e.g., 70%, 80%, 90%, 95%, 98%, 99%, etc.), the two historical vectors may be clustered in different historical document clusters.

Once the one or more historical documents or historical vectors have been optionally clustered, the method 200 may return to optional block 222 shown in FIG. 2A.

At optional block 222, the method 200 might continue by correlating, using the computing system and one or more machine learning algorithms, the one or more first documents and the one or more historical documents to determine whether at least one historical document pattern of the one or more historical document patterns of the one or more historical documents correlates to the one or more first documents.

Figure 2C:
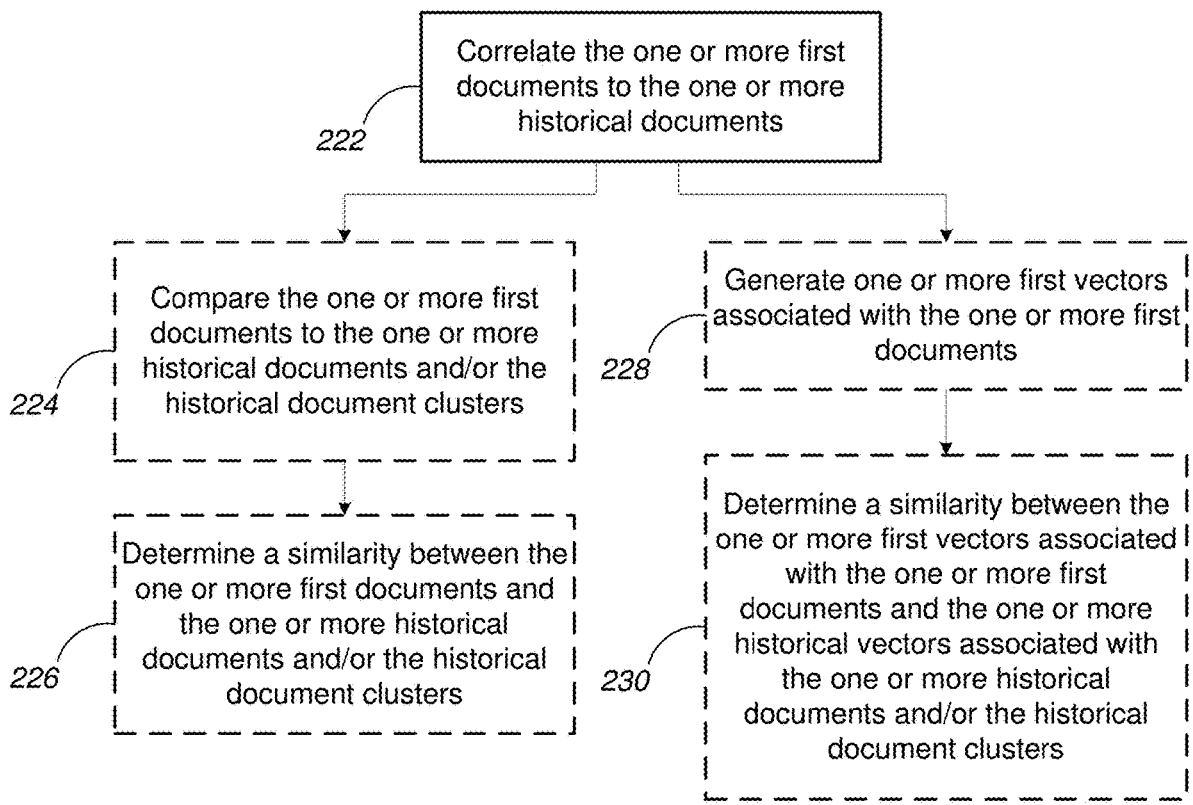
Figure 2D:
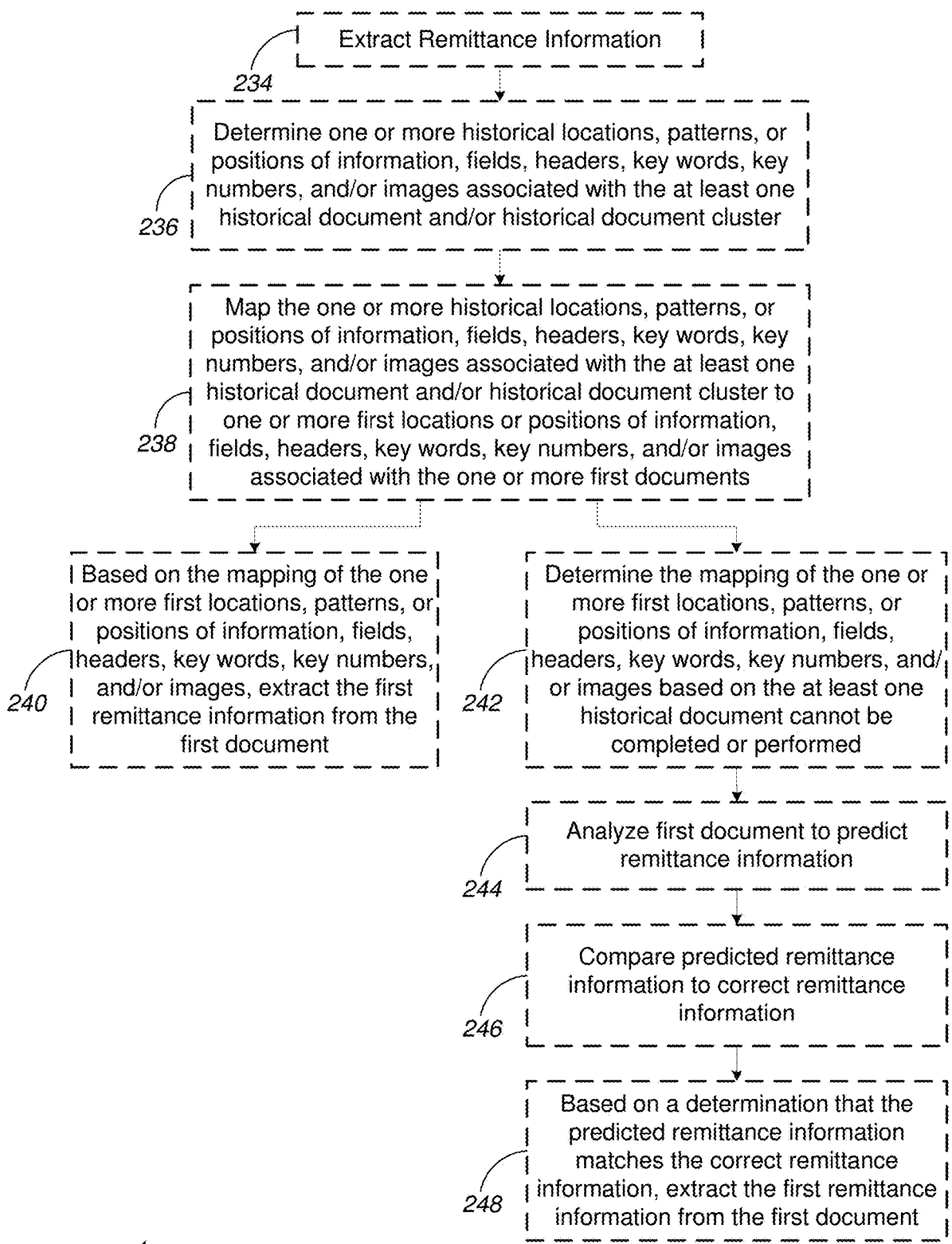

This correlation step 222 may continue in FIG. 2C at optional block 224 and/or at optional block 228.

The correlation step 222 may include, at optional block 224, of FIG. 2C, comparing, using the computing system and the one or more machine learning algorithms, the one or more first documents to the one or more historical documents obtained in step 208 and/or to the one or more historical document clusters formed from optional step 214. In some instances, the computing system may compare one or more first document patterns to one or more historical patterns of the one or more historical documents and/or one or more historical document cluster patterns of the one or more historical document clusters. Based on the comparison, at optional block 226, the computing system, using the one or more machine learning algorithms, may determine a similarity between the one or more first documents and the one or more first historical documents and/or the one or more historical document clusters. In some cases, a representative historical document may be selected to represent each historical document cluster and used to correlate and compare to the one or more first documents and extract remittance information from the one or more first documents.

The one or more machine learning algorithms may be trained to analyze the one or more first documents based on the historical documents. Based on the historical documents, the machine learning algorithms may learn to look for predicted locations, positions, patterns, information, fields, headers, key words, key numbers, and/or images of remittance information in the one or more first documents based on potential corresponding locations, positions, patterns, information, fields, headers, key words, key numbers, and/or images of remittance information in the historical documents and/or historical document clusters. Based on the identified predicted locations, positions, patterns, information, fields, headers, key words, key numbers, and/or images of remittance information in the one or more first documents, the machine learning algorithms may then use this information to compare the one or more first documents to the one or more historical documents and/or to the one or more historical document clusters to determine whether at least one historical document or historical document cluster correlates to the one or more first documents.

The similarity of the one or more first documents and the one or more historical documents and/or the one or more historical document clusters may be determined, using the one or machine learning algorithms, based on an identification and comparison of information, locations, positions, patterns, fields, headers, key words, key numbers, and/or images of remittance information contained within the one or more first documents and the one or more historical documents and/or historical document clusters, an identification and comparison of portions of information, locations, positions, patterns, fields, headers, key words, key numbers, and/or images of remittance information contained within the one or more first documents and the one or more historical documents and/or historical document clusters, an identification and comparison of locations, patterns, or positions of information, fields, headers, key words, key numbers, and/or images of remittance information contained within the one or more first documents and the one or more historical documents and/or historical document clusters, and/or an identification and comparison of locations, patterns, or positions of portions of information, fields, headers, key words, key numbers, and/or images of remittance information contained within the one or more first documents and the one or more historical documents and/or historical document clusters, and/or the like.

The similarity between the one or more first documents and one or more historical documents and/or historical document clusters may be determined based on a determination of the overlapping or on a calculation of a percentage of the overlapping locations, patterns, positions, information, fields, headers, key words, key numbers, and/or images contained within the one or more first documents and the one or more historical documents and/or historical document clusters. In some cases, text recognition software may be used to determine overlapping information, key words, and/or key numbers contained within the one or more first documents and the one or more historical documents and/or historical document clusters.

In other cases, the correlation step 222 may include, at optional block 228, generating, using the computing system, one or more first vectors associated with the one or more first documents and, at optional block 230, determining, using the computing system, a similarity between the one or more first vectors and the one or more historical vectors associated with the one or more historical document vectors formed in step 216 and/or the one or more historical vectors associated with the one or more document clusters formed in step 220. In some cases, the one or more first vectors associated with the one or more first documents may generated based on a pattern of the one or more first documents.

The one or more first vectors may be generated based on or correspond to locations, positions, patterns, information, fields, headers, key words, key numbers, and/or images contained within the one or more first documents, portions of locations, positions, patterns, information, fields, headers, key words, key numbers, and/or images contained within the one or more first documents, locations, patterns, or positions of information, fields, headers, key words, key numbers, and/or images contained within the one or more first documents, or locations, patterns, or positions of portions of information, fields, headers, key words, key numbers, and/or images contained within the one or more first documents, and/or the like.

The similarity of the one or more first vectors and the one or more historical vectors or document clusters may be determined based on a comparison of the one or more first vectors to the one or more historical vectors and/or document clusters at optional step 230 of method 200. The similarity between the one or more first vectors and one or more historical vectors may be determined based on a calculation of the overlapping information, fields, headers, key words, key numbers, and/or images contained within the one or more first documents and the one or more historical documents and/or based on a similarity of a pattern of the one or more first vectors and one or more historical vectors.

Based on the determined similarity between the one or more first document and the one or more historical documents, the method 200 may then return to FIG. 2A, at optional block 232 and/or optional block 254.

Method 200, at optional block 232, might include determining, using the computing system, that at least one first historical document of the one or more historical documents and/or first historical document cluster of the one or more historical document clusters correlates to the one or more first documents based on the similarity between the one or more first documents and the one or more first historical documents obtained in step 226 and/or based on the similarity between the one or more first vectors and the one or more first historical vectors obtained in step 230.

The one or more first documents may be determined to be similar to the one or more first historical documents and/or document clusters based on a threshold of overlapping locations, patterns, positions, information, fields, headers, key words, key numbers, images and/or vectors between the one or more first documents and the one or more historical documents. In a non-limiting example, if the computing system determines the similarity between one or more first documents and at least one historical document or at least one historical document cluster is greater than a percentage (e.g., 70%, 80%, 90%, 95%, 98%, 99%, etc.), then the one or more first documents may correlate or be similar to the at least one historical document or the at least one historical document cluster. If the computing system determines the similarity between one or more first documents and the at least one historical document or at least one historical document cluster is less than a percentage (e.g., 70%, 80%, 90%, 95%, 98%, 99%, etc.), then the one or more first documents may not correlate or may not be similar to the at least one historical document or the at least one historical document cluster.

In some instances, the one or more first documents may have some degree of deviation from the at least one historical document or the at least one historical document cluster. In a non-limiting example, a different payment amount (e.g., $100, $120, etc.) may result in certain degree of deviation between the one or more first documents and the at least one historical document or the at least one historical document cluster. However, as long as the degree of deviation is less than a particular threshold (e.g., 10%) and the similarity is above a particular threshold (e.g., 90%), then the at least one historical document or at least one historical document cluster may be considered to correlate to the one or more first documents.

Based on a determination that the at least one historical document of the one or more historical documents and/or historical document cluster of the one or more document clusters correlates to the one or more first documents based on the similarity between the one or more first documents and the one or more historical documents, based on the similarity between the one or more first vectors and the one or more first historical vectors of one or more document clusters, and/or based on the similarity between the one or more first document patterns and the one or more historical document patterns, the method 200, at optional block 234 might comprise extracting, using the computing system, the first remittance information from the one or more first documents based on the least one historical document and/or based on at least one historical document cluster. In some cases, a representative historical document may be selected to represent each historical document cluster and used to extract remittance information from the one or more first documents This extraction process might continue on in FIG. 2D, at optional block 236.

In some embodiments, method 200, at optional block 236, might include determining, using the computing system and one or more machine learning algorithms, one or more historical locations, patterns, positions, information, fields, headers, key words, key numbers, and/or images of remittance information associated with the at least one first historical document and/or the at least one first historical document cluster or historical locations, patterns, or positions of information, fields, headers, key words, key numbers, and/or images of remittance information associated with the at least one first historical document and/or the at least one first historical document cluster. The one or more historical locations, patterns, positions, information, fields, headers, key words, key numbers, and/or images of remittance information may have been previously determined using steps 258-278 of method 200.

In various cases, method 200, at optional block 238, might include mapping, using the computing system and the one or more machine learning algorithms, the one or more historical locations, patterns, positions, information, fields, headers, key words, key numbers, and/or images of remittance information associated with the at least one first historical document and/or the at least one first historical document cluster to one or more first locations, patterns, positions, information, fields, headers, key words, key numbers, and/or images of remittance information associated with the one or more first documents. In some cases, the one or more historical locations, patterns, or positions of information, fields, headers, key words, key numbers, and/or images of remittance information associated with the at least one first historical document and/or the at least one first historical document cluster might be mapped to the one or more first locations, patterns, or positions of information, fields, headers, key words, key numbers, and/or images of remittance information associated with the one or more first documents.

In other words, the computing system might use the at least one first historical document and/or first historical document cluster that is most similar to the one or more first documents to extract remittance information from the first document. In a non-limiting example, if the account number typically appears in a top-left corner of a historical document as shown in FIG. 3, then the computing system may use the one or more machine learning algorithms to locate this location and determine the account number of the one or more first documents. Alternatively, if a remittance amount always appears below the header, field, and/or key word "Amount Paid," as shown in FIG. 4, then the computing system may use the one or more machine learning algorithms trained based on the at least one historical document to locate this header, field, and/or key word and location in the one or more first documents and determine the amount paid was $100.00 and/or $750.00.

Once all the key remittance locations, patterns, positions, information, fields, headers, key words, key numbers, and/or images of the one or more first documents have been located based on the historical locations, patterns, positions, information, fields, headers, key words, key numbers, and/or images of the at least one historical document have been determined and mapped, method 200 may continue on to block 240 and extract, using the computing system, the first remittance information from the first document. In another non-limiting example, if the account number typically appears in a top-left corner of a historical document as shown in FIG. 3, then the computing system may use the one or more machine learning algorithms to locate this location and extract the account number from the one or more first documents. Alternatively, if a remittance amount always appears below the header, field, and/or key word "Amount Paid," as shown in FIG. 3, then the computing system may use the one or more machine learning algorithms trained based on the at least one historical document to locate this header, field, and/or key word and location in the one or more first documents and extract the remittance paid (e.g., $100.00 and/or $750.00) located below the "Amount Paid" header.

In some cases, the at least one historical document and/or historical document cluster may be different or vary slightly from the one or more first documents and the historical locations, patterns, positions, information, fields, headers, key words, key numbers, and/or images might not map to the first locations, patterns, positions, information, fields, headers, key words, key numbers, and/or images of the one or more first documents. In this scenario, the computing system might first extract some of the remittance data or as much of the remittance data that the computing system can based on the mapping of the historical locations, patterns, positions, information, fields, headers, key words, key numbers, and/or images to the one or more first locations, patterns, positions, information, fields, headers, key words, key numbers, and/or images of the one or more first documents.

Next, if none of the remittance information can be extracted or if only some of the remittance information can be extracted method 200, might continue on to block 242, by determining, using the computing system, the mapping of the one or more historical locations, patterns, positions, fields, or key words based on the at least one historical document or historical document cluster to the one or more first locations, patterns, positions, fields, or key words of the one or more first documents cannot be completed or performed.

In various embodiments, the method, at optional block 244 might include, without limitation, analyzing, using the computing system, the one or more first documents to predict remittance information in the one or more first documents. This predicted information may be determined using text recognition software and/or the like. In this scenario, the computing system might extract all predicted remittance information (e.g., at least one of a possible customer associated with the one or more first documents, a possible vendor associated with the one or more first documents, a possible invoice number associated with the one or more first documents, a possible invoice amount associated with the one or more first documents, a possible invoice date associated with the one or more first documents, a possible payment associated with the one or more first documents, a possible payment date associated with the one or more first documents, a possible credit number associated with the one or more first documents, a possible debit number associated with the one or more first documents, a possible check number associated with the one or more first documents, or a possible account number associated with the one or more first documents, and/or the like).

Method 200, at optional block 246 might then compare all or some of this predicted remittance information against correct or already entered remittance information stored as accounts receivable data, accounts payable data, general ledger data, invoice data, customer data, vendor data, etc. in a company database. The computing system may then determine that all or some of the predicted remittance information matches the correct or already entered remittance information. Based on this comparison and determination that all or some of the predicted remittance information matches the correct or already entered remittance information stored in the company database, method 200, at optional block 248, might comprise, without limitation, extracting the predicted remittance information based on the determination that at least one or some of the predicted remittance information matches at least one or some of the correct or already entered remittance information stored in the company database.

In a non-limiting example, the computing system might predict that one or more numbers of the one or more first documents match one or more invoice numbers stored in a company database. The computing system might locate the predicted invoice numbers in the one or more first documents and compare the predicted invoice numbers to the one or more invoice numbers stored in a company database. Based on a determination that at least one predicted invoice number matches at least one invoice numbers stored in the company database, the computing system might determine that the predicted invoice number is the correct invoice number and extract the predicted invoice number as the invoice number associated with the one or more first documents.

Method 200 may then return to FIG. 2A, at optional block 250, and continue by linking the extracted remittance information from the one or more first documents to at least one of a customer associated with the one or more first documents, a vendor associated with the one or more first documents, an invoice number associated with the one or more first documents, an invoice amount associated with the one or more first documents, an invoice date associated with the one or more first documents, a payment associated with the one or more first documents, a payment date associated with the one or more first documents, a credit number associated with the one or more first documents, a debit number associated with the one or more first documents, a check number associated with the one or more first documents, or an account number associated with the one or more first documents, and/or the like. Based on the linking of the extracted remittance information, the method 200, at optional block 252 might continue by entering, the extracted remittance information into at least one of an account associated with at least one of an accounts receivable account, an accounts payable account, a general ledger, a balance sheet, a customer account, an invoice account, a vendor account, a company account, and/or the like.

In some instances, the method 200, at optional block 254, might determine that the remittance information cannot be extracted based on the at least one historical document or historical document cluster or that no historical documents or historical document clusters correlate to the one or more first documents.

Figure 2E:

Based on a determination that the remittance information cannot be extracted based on the at least one historical document or historical document cluster or based on a determination that no historical documents or historical document clusters correlate to the one or more first documents, method 200 might continue on to optional block 256 of FIG. 2E.

In some cases, method 200, at optional block 256, might comprise flagging, using the computing system, the one or more first documents for further review based on a determination that the remittance information cannot be extracted based on the at least one historical document or historical document cluster or based on a determination that no historical documents or historical document clusters correlate to the one or more first documents. This further review may be performed automatically by the computing system (optional steps 258-264) or manually by a user or an analyst (optional steps 266-270).

In various embodiments, similar to optional blocks 244 and 246, the method, at optional block 258 might include, without limitation, automatically analyzing, using the computing system, the one or more first documents to predict remittance information in the one or more first documents. This predicted information may be determined using text recognition software and/or the like. In this scenario, the computing system might extract all predicted remittance information (e.g., at least one of a possible customer associated with the one or more first documents, a possible vendor associated with the one or more first documents, a possible invoice number associated with the one or more first documents, a possible invoice amount associated with the one or more first documents, a possible invoice date associated with the one or more first documents, a possible payment associated with the one or more first documents, a possible payment date associated with the one or more first documents, a possible credit number associated with the one or more first documents, a possible debit number associated with the one or more first documents, a possible check number associated with the one or more first documents, or a possible account number associated with the one or more first documents, and/or the like).

Method 200, at optional block 260 might then compare all or some of this predicted remittance information against correct or already entered remittance information stored as accounts receivable data, accounts payable data, general ledger data, invoice data, customer data, vendor data, etc. in a company database. The computing system may then determine that all or some of the predicted remittance information matches the correct or already entered remittance information. Based on this comparison and determination that all or some of the predicted remittance information matches the correct or already entered remittance information stored in the company database, method 200, at optional block 262, might comprise, without limitation, mapping and extracting the predicted remittance information based on the determination that at least one or some of the predicted remittance information matches at least one or some of the correct or already entered remittance information stored in the company database.

Mapping the predicted remittance information based on the determination that at least one or some of the predicted remittance information matches at least one or some of the correct or already entered remittance information stored in the company database might include determining one or more locations, patterns, positions, information, fields, headers, key words, key numbers, and/or images of remittance information matching at least one or some of the correct or already entered remittance information and/or one or more locations, patterns, or positions of information, fields, headers, key words, key numbers, and/or images of remittance information matching at least one or some of the correct or already entered remittance information. Based on this determination, the computing system might determine that the one or more locations, patterns, positions, information, fields, headers, key words, key numbers, and/or images of remittance information matching at least one or some of the correct or already entered remittance information typically appear in the one or more first documents and/or that the information, fields, headers, key words, key numbers, and/or images of remittance information matching at least one or some of the correct or already entered remittance information typically appear in a particular location, pattern, or position of the one or more first documents.

Based on this determination that the remittance information typically appears in the one or more first documents and/or appears in a particular location, pattern, or position, the method 200, at optional block 264, might retrain the one or more machine learning algorithms based on the mapped information in the one or more first documents. In other words, when one or more additional documents are received containing remittance information, the computing system, using the one or more machine learning algorithms, may determine that the one or more additional documents correlate to the one or more first documents (which are now historical documents) and the one or more first documents may be used to map and extract the remittance information from the one or more additional documents.

In a non-limiting example, the computing system might predict one or more numbers of the one or more first documents match one or more invoice numbers stored in a company database. The computing system might locate the predicted invoice numbers in the one or more first documents and compare the predicted invoice numbers to the one or more invoice numbers stored in a company database. Based on a determination that at least one predicted invoice number matches at least one invoice numbers stored in the company database, the computing system might determine that the predicted invoice number is the correct invoice number. The computing system might then determine and map the location of the predicted invoice number within the one or more first documents as the correct location for the invoice number associated with the one or more first documents and extract the predicted invoice number as the correct invoice number for the one or more first documents. The computing system may then retrain the one or more machine learning algorithms so that if the computing system receives a similar document to the one or more first documents, the computing system can efficiently and effectively extract the invoice number from the similar document.

In some cases, the method, at optional block 266 might include, without limitation, automatically analyzing or reviewing, using the computing system, the one or more first documents to determine one or more locations, patterns, positions, information, fields, headers, key words, key numbers, and/or images of remittance information. This process may occur when the computing system is unable to compare predicted remittance information to correct remittance information or may occur independently without comparing the predicted remittance information to correct remittance information. In various embodiments, in order to analyze or review the one or more first documents, method 200 might optionally perform, using the computing system, text recognition on the one or more first documents to determine the one or more locations, patterns, positions, information, fields, headers, key words, key numbers, and/or images of remittance information in the one or more first documents. In a non-limiting example, the computing system might perform text recognition to locate specific headers, fields, or key words (e.g., "Amount Paid," "Invoice No.," etc.).

In some instances, based on a determination of the one or more locations, patterns, positions, information, fields, headers, key words, key numbers, and/or images of remittance information in the one or more first documents, the computing system might map and extract the one or more locations, patterns, positions, information, fields, headers, key words, key numbers, and/or images of remittance information in the one or more first documents at optional block 268 of method 200. The one or more machine learning algorithms may then be retrained to use the one or more first documents as historical documents for future documents (optional block 270).

In some cases, the remittance information may not be able to be automatically extracted by the computing system. In those cases, the method 200, at optional block 272, may send the one or more first documents to a user or an analyst to review. The method, at optional block 274, may then comprise tracking, using the computing system, at least one or more user movements on a user interface of the computing system or one or more user extractions from the one or more first documents to map and extract one or more locations, patterns, positions, information, fields, headers, key words, key numbers, and/or images of remittance information in the one or more first documents. The computing system might determine one or more locations, patterns, positions, information, fields, headers, key words, key numbers, and/or images of remittance information in the one or more first documents based on a determination of the key words and/or key numbers that the user is copying and/or entering into at least one of an accounts receivable account, an accounts payable account, a general ledger, a balance sheet, a customer account, an invoice account, a vendor account, a company account, and/or the like.

In some instances, based on a determination of the one or more locations, patterns, positions, information, fields, headers, key words, key numbers, and/or images of remittance information in the one or more first documents, method 200, at block 276 might include mapping and extracting, with the computing system, the one or more locations, patterns, positions, information, fields, headers, key words, key numbers, and/or images of remittance information in the one or more first documents. The one or more machine learning algorithms may then be retrained to use the one or more first documents as historical documents for future documents at optional block 278 of method 200.

These and other functions of the method 200 are described in greater detail above and below with respect to FIGS. 1 and 3-6.

FIGS. 3A and 3B (collectively, "FIG. 3") are example remittance documents 300a and 300b for implementing automatic document pattern recognition and analysis to reduce identification time, extraction time, entry time, and handling time of remittance information, in accordance with various embodiments.

Remittance documents 300a and 300b might be the one or more first documents described in FIG. 2 and/or the one or more historical documents described in FIG. 2. The remittance documents might be a company invoice, a payment for an invoice, an invoice from a vendor, a receipt for a payment, a check from a customer, and/or the like.

The remittance documents 300a and 300b might contain, without limitation, at least one of a customer 305, a vendor 310, an invoice number 315, an invoice amount 320, an invoice date 325, a payment 330, a payment date 335, a discount 340, a credit number, a debit number, a check number 345, or an account number 350, and/or the like. The remittance documents 300a and 300b are not limited to containing only the remittance information listed above and may contain additional remittance information.

In some cases, the remittance documents 300a and 300b might further contain one or more one or more fields, headers, key words, and/or key numbers. The one or more fields, headers, key words, and/or key numbers might include, without limitation, "amount billed" 355 identifying the amount billed for an invoice or a transaction, "payment amount" 360 identifying an amount paid, "invoice number" 365 identifying an invoice number, "customer number" 370 identifying a customer number or customer account number, "date" 375 identifying a date, "discount" 380 identifying an amount or a percentage of a discount, "from" 385 identifying a source of the remittance information, "to" 390 identifying a recipient of the remittance information, etc. The remittance documents 300a and 300b are not limited to containing only the fields, headers, key words, and/or key numbers listed above and may contain additional fields, headers, key words, and/or key numbers.

The computing system 105 and/or 115 of FIG. 1 and the method 200 might use these example remittance documents 300a and 300b to train one or more machine learning algorithms, to map remittance information, to extract remittance information, and/or the like.

FIG. 4 is an example cluster 400 of historical documents 405a, 405b, 405c for implementing automatic document pattern recognition and analysis to reduce identification time, extraction time, entry time, and handling time of remittance information, in accordance with various embodiments.

In some cases, computing system 105 and/or 115 of FIG. 1 and/or method 200 might generate one or more vectors based on the historical documents 405a, 405b, 405c. Additionally, a computing system 105 and/or 115 of FIG. 1 and/or method 200 might cluster one or more historical documents 405a, 405b, 405c into one or more historical document clusters 400 based on a first similarity between the one or more historical documents.

The similarity may be determined based on a comparison of locations, patterns, positions, fields, headers, key words, key numbers, and/or images of remittance information contained within the one or more historical documents, a comparison of portions of locations, patterns, positions, fields, headers, key words, key numbers, and/or images of remittance information contained within the one or more historical documents, a comparison of locations, patterns, or positions of fields, headers, key words, key numbers, and/or images contained within the one or more historical documents, and/or a comparison of locations, patterns, or positions of portions of fields, headers, key words, key numbers, and/or images contained within the one or more historical documents, and/or the like.

Each historical document cluster 400 of the one or more historical document clusters may have one or more historical documents 405a, 405b, 405c having a threshold degree of similarity based on a comparison of overlapping locations, patterns, positions, fields, headers, key words, key numbers, and/or images of remittance information contained within the one or more historical documents, a comparison of overlapping portions of locations, patterns, positions, fields, headers, key words, key numbers, and/or images of remittance information contained within the one or more historical documents, a comparison of overlapping locations, patterns, or positions of fields, headers, key words, key numbers, and/or images of remittance information contained within the one or more historical documents, and/or a comparison of overlapping locations, patterns, or positions of portions of locations, positions, fields, headers, key words, key numbers, and/or images of remittance information contained within the one or more historical documents, and/or the like.

In a non-limiting example, if the computing system determines the similarity between at least two historical documents 405a, 405b, and 405c is greater than a percentage (e.g., 70%, 80%, 90%, 95%, 98%, 99%, etc.), then the at least two historical documents 405a, 405b, and 405c may be clustered together in a first historical document cluster 400. If the computing system determines that the similarity between the at least two historical documents 405a, 405b, and 405c is less than a percentage (e.g., 70%, 80%, 90%, 95%, 98%, 99%, etc.), then the at least two historical documents 405a, 405b, and 405c may be clustered in different historical document clusters.

Each document within a historical document cluster may have some degree of deviation from other documents within the historical document cluster. In a non-limiting example, a different payment amount (e.g., $100, $750, etc.) may result in certain degree of deviation between documents in a document cluster 400. However, as long as the degree of deviation is less than a particular threshold (e.g., 10%) and the similarity is above a particular threshold (e.g., 90%), then one or more historical documents 405a, 405b, and 405c may still be grouped together in a historical document cluster 400.

The computing system 105 and/or 115 of FIG. 1 and the method 200 might use these document clusters 400 to train one or more machine learning algorithms, to map remittance information, to extract remittance information, and/or the like.

Exemplary System and Hardware Implementation

Figure 5:
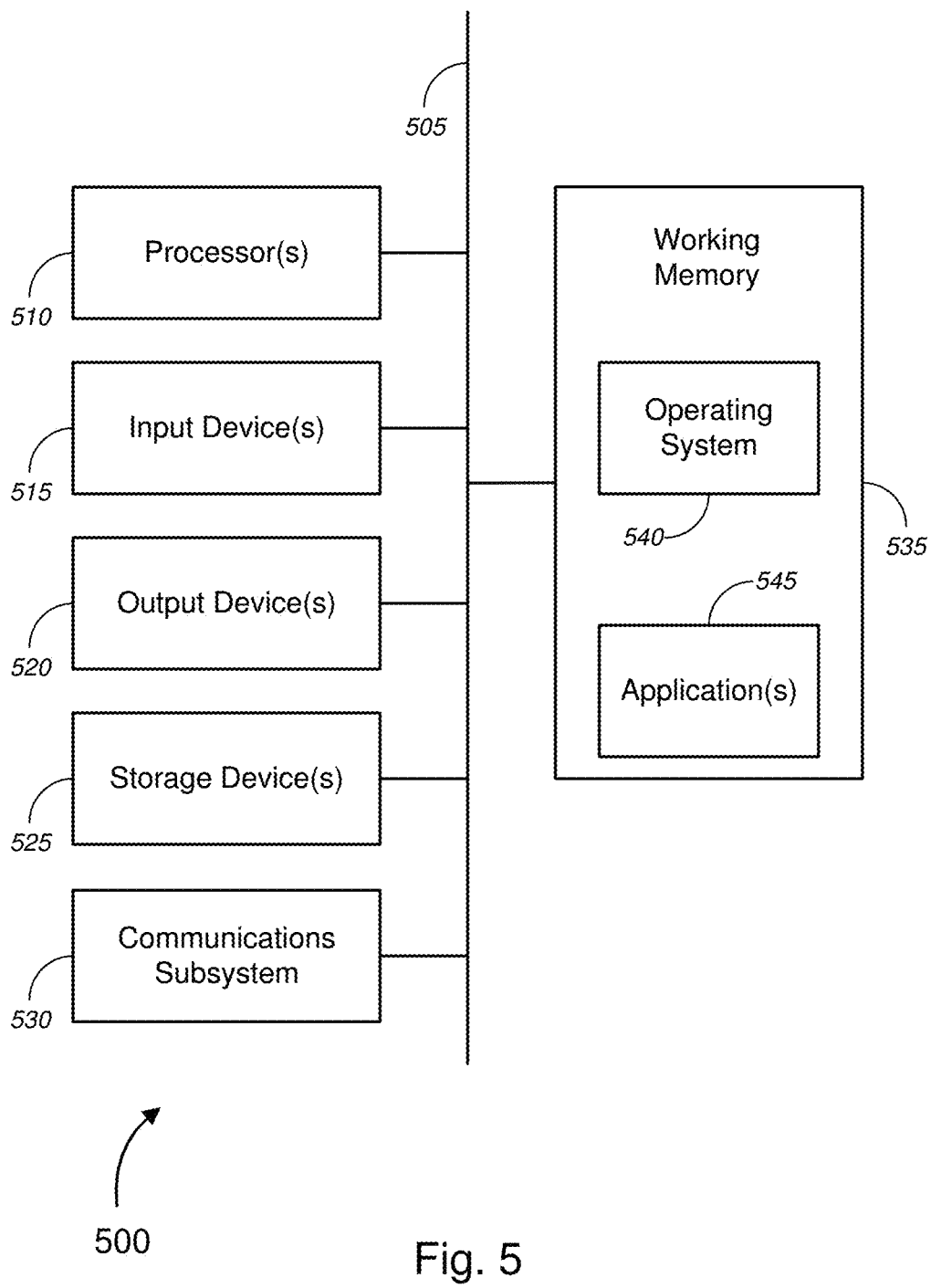
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of system hardware that can perform the methods provided by various other embodiments, as described herein, and/or can perform the functions of computer or hardware system (e.g., first computing system(s) 105, second computing system(s) 115, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (e.g., first computing system(s) 105, second computing system(s) 115, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
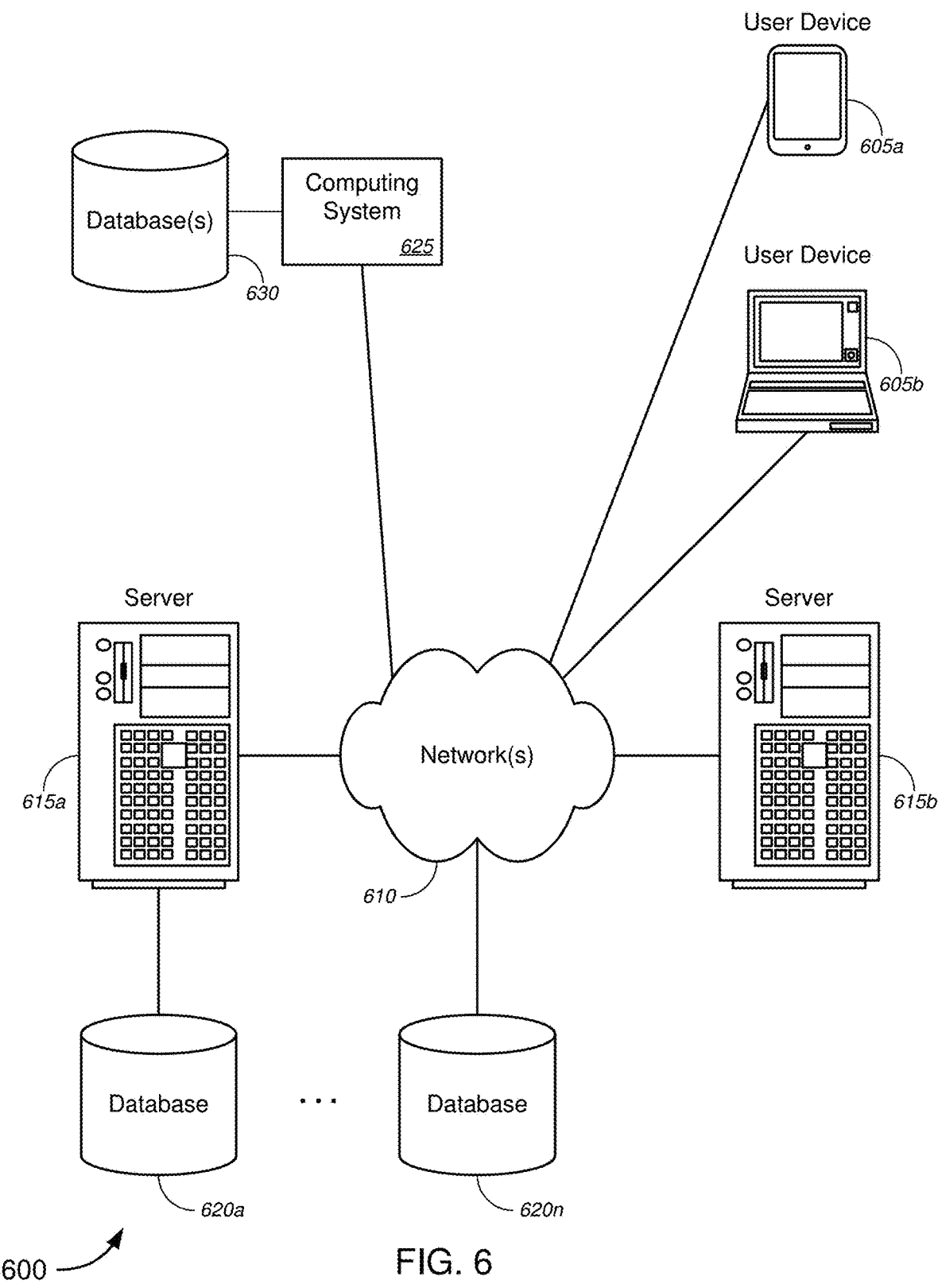
FIG. 6 is a block diagram illustrating a networked system of computers, computing systems, or system hardware architecture, which can be used in accordance with various embodiments.

As noted above, a set of embodiments comprises methods and systems for detecting and correcting anomalous events in real-time in finance and accounting and, more particularly, methods, systems, and apparatuses for detecting and correcting anomalous events in real-time as users enter data into a general ledger. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 (similar to network(s) 120 of FIG. 1, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for detecting and correcting anomalous events in real-time in finance and accounting and, more particularly, for detecting and correcting anomalous events in real-time as users enter data into a general ledger, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise a computing system 625 (similar to first computing system 105 of FIG. 1, or the like) and corresponding database(s) 630 (similar to database(s) 110 of FIG. 1, or the like).

In operation, one or more computing systems 625 might receive one or more first documents containing first remittance information. The one or more computing systems 625 might analyze the one or more first documents to extract first remittance information from the first document. In order to analyze the one or more first documents to extract the first remittance information from the first document, the one or more computing systems might obtain one or more historical documents stored in the one or more computing systems 625 and/or databases 620 or 630 and correlate, using one or more machine learning algorithms, the one or more first documents to the one or more historical documents. Next, based on the correlation of the one or more first documents to the one or more historical documents, the one or more computing systems 625 might determine that at least one historical document pattern correlates to the one or more first documents. Additionally, the one or more computing systems 625 might extract the first remittance information from the one or more first documents based on the at least one historical document.

These and other functions of the system 600 (and its components) are described in greater detail above with respect to FIGS. 1-5.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without-certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
    receiving, using a computing system, a first document containing first remittance information;
    analyzing, using the computing system, the first document to extract the first remittance information from the first document, wherein analyzing the first document comprises:
        obtaining, using the computing system, one or more historical documents containing historical remittance information; and
        correlating, using the computing system and one or more machine learning algorithms, the first document to the one or more historical documents to determine whether at least one historical document pattern of one or more historical document patterns of the one or more historical documents correlates to the first document, wherein correlating the first document to the one or more historical documents comprises:
            generating, using the computing system, one or more historical vectors associated with the one or more historical document patterns;
            clustering, using the computing system, the one or more historical vectors into one or more document clusters based on a first similarity between the one or more historical vectors;
            generating, using the computing system, a first vector associated with the first document;
            correlating, using the computing system, the first vector with the one or more document clusters to determine a second similarity between the first vector and the one or more document clusters; and
            based on a second similarity between the first vector and the one or more document clusters, determining, using the computing system, that the first document correlates to the at least one first historical document pattern contained within at least one of the one or more document clusters;
        determining, using the computing system, that at least one first historical document pattern of the one or more historical document patterns correlates to the first document; and
        based on a determination that the at least one first historical document pattern of the one or more historical document patterns correlates to the first document, extracting, using the computing system, the first remittance information from the first document based on the least one first historical document pattern.

2. The method of claim 1, wherein the first document is at least one of a scanned document, a scanned image, an image file, a portable document format file, a text file, or a spreadsheet file.

3. The method of claim 1, wherein extracting the first remittance information from the first document based on the least one first historical document pattern further comprises:

identifying, using the computing system and the at least one first historical document pattern, an invoice associated with the first remittance information of the first document and at least one of a payment amount, a discount amount, a total amount of the invoice, or a date of the invoice associated with the first remittance information of the first document;
    mapping, using the computing system, the invoice to at least one of the payment amount, the discount amount, the total amount of the invoice, or the date of the invoice; and
    based on mapping the invoice to at least one of the payment amount, the discount amount, the total amount of the invoice, or the date of the invoice, entering, using the computing system, the payment amount, the discount amount, the total amount of the invoice, or the date of the invoice into at least one of a general ledger, an accounts receivable account, or an accounts payable account.

4. The method of claim 1, wherein extracting the first remittance information from the first document based on the least one first historical document pattern further comprises:
    determining, using the computing system, one or more historical fields in the at least one first historical document pattern;
    mapping, using the computing system, one or more first fields in the first document based on the one or more historical fields in the at least one first historical document pattern; and
    based on the mapping of the one or more first fields, extracting, using the computing system, the first remittance information from the first document.

5. The method of claim 4, wherein at least one of the one or more historical fields or the one or more first fields comprise at least one of a customer field, a vendor field, an invoice number field, an invoice amount field, a payment field, a date field, a transaction type field, a credit number field, a debit number field, a check number field, an account number field, a discount amount field, or a reference number field.

6. The method of claim 1, wherein the first remittance information comprises at least one of a customer associated with the first document, a vendor associated with the first document, an invoice number associated with the first document, an invoice amount associated with the first document, an invoice date associated with the first document, a payment associated with the first document, a payment date associated with the first document, a discount amount associated with the first document, a credit number associated with the first document, a debit number associated with the first document, a check number associated with the first document, an address associated with the first document, or an account number associated with the first document.

7. The method of claim 1, wherein analyzing, using the computing system, the first document to extract first remittance information from the first document occurs in realtime after the first document has been received.

8. The method of claim 1, wherein generating the one or more historical vectors associated with the one or more historical document patterns comprises generating the one or more historical vectors based on at least one of one or more historical scanned copies of the one or more historical documents or one or more historical images of the one or more historical documents and wherein generating the first vector associated with the first document comprises generating the first vector based on at least one of one or more first scanned copies of the first document or one or more first images of the first document.

9. The method of claim 1, wherein the first similarity between the one or more historical vectors is based on one or more historical locations, patterns, or positions of one or more historical keywords located in the one or more historical documents, and wherein the second similarity between the one or more document clusters and the first vector is based on a comparison of one or more first locations, patterns, or positions of one or more first keywords of the first document with the one or more historical locations, patterns, or positions of the one or more historical keywords located in a corresponding document cluster.

10. The method of claim 1, further comprising:
receiving, using the computing system, a second document containing second remittance information;
analyzing, using the computing system, the second document to extract the second remittance information from the second document, wherein the analyzing comprises:
obtaining, using the computing system, the one or more historical documents containing the historical remittance information; and
correlating, using the computing system and the one or more machine learning algorithms, the second document to the one or more historical documents to determine whether at least one second historical document pattern of the one or more historical document patterns correlates to the second document; and
determining, using the computing system, that no historical document patterns correlate to the second document;
based on a determination that no historical document patterns correlate to the second document, flagging, using the computing system, the second document for review.

11. The method of claim 10, further comprising:
automatically reviewing, using the computing system, the second document, wherein reviewing the second document further comprises:
performing, using the computing system, text recognition on the second document to determine one or more second fields of the second document; and
based on the determined one or more second fields, extracting the second remittance information from the second document.

12. The method of claim 11, wherein the computing system uses the text recognition to determine one or more key words associated with the one or more second fields.

13. The method of claim 12, wherein the one or more key words comprise at least one of one or more names, one or more invoice labels or terms, one or more amount labels or terms, one or more payment or transaction types, one or more date labels or terms, one or more payment labels or terms, one or more account labels or terms, one or more account number labels or terms, or one or more check labels or terms.

14. The method of claim 11, further comprising:
based on the automatic review of the second document, retraining, using the computing system, the one or more machine learning algorithms based on the second document.

15. The method of claim 10, further comprising:
sending, using the computing system, the second document to a user to review;
tracking, using the computing system, at least one or more user movements on a user interface of the computing system or one or more user extractions from the second document to extract one or more second fields of the second document; and
based on the extracted one or more second fields, extracting the second remittance information from the second document.

16. The method of claim 15, tracking the one or more user movements or the one or more user extractions comprises:
tracking, using the computing system, the one or more user movements or the one or more user extractions to determine a location in the second document of the one or more second fields; and
correlating, using the computing system, each second field of the one or more second fields to a corresponding location in the second document.

17. The method of claim 16, further comprising:
based on a correlation of each second field of the one or more second fields to the corresponding location in the second document, retraining, using the computing system, the one or more machine learning algorithms based on the second document.

18. A computing system comprising:
at least one processor; and
a non-transitory computer readable medium communicatively coupled to the at least one processor, the non-transitory computer readable medium having stored thereon computer software comprising a set of instructions that, when executed by the at least one processor, causes the computing system to:
receive a first document containing first remittance information;
analyze the first document to extract the first remittance information from the first document, wherein analyzing the first document comprises:
obtaining one or more historical documents containing historical remittance information;
correlating, using one or more machine learning algorithms, the first document to the one or more historical documents to determine whether at least one historical document pattern of one or more historical document patterns of the one or more historical documents correlates to the first document, wherein correlating the first document to the one or more historical documents comprises:
generating, using the computing system, one or more historical vectors associated with the one or more historical document patterns;
clustering, using the computing system, the one or more historical vectors into one or more document clusters based on a first similarity between the one or more historical vectors;
generating, using the computing system, a first vector associated with the first document;
correlating, using the computing system, the first vector with the one or more document clusters to determine a second similarity between the first vector and the one or more document clusters; and
based on a second similarity between the first vector and the one or more document clusters, determining, using the computing system, that the first document correlates to the at least one first historical document pattern contained within at least one of the one or more document clusters;

determine that at least one first historical document pattern of the one or more historical document patterns correlates to the first document; and based on a determination that the at least one first historical document pattern of the one or more historical document patterns correlates to the first document, extract the first remittance information from the first document based on the least one first historical document pattern.

19. A non-transitory computer readable medium having stored thereon computer software comprising a first set of instructions that, when executed by a processor, causes the processor to:

receive a first document containing first remittance information;

analyze the first document to extract the first remittance information from the first document, wherein analyzing the first document comprises:

obtaining one or more historical documents containing historical remittance information;

correlating, using one or more machine learning algorithms, the first document to the one or more historical documents to determine whether at least one historical document pattern of one or more historical document patterns of the one or more historical documents correlates to the first document, wherein correlating the first document to the one or more historical documents comprises:

generating, using the computing system, one or more historical vectors associated with the one or more historical document patterns;

clustering, using the computing system, the one or more historical vectors into one or more document clusters based on a first similarity between the one or more historical vectors;

generating, using the computing system, a first vector associated with the first document;

correlating, using the computing system, the first vector with the one or more document clusters to determine a second similarity between the first vector and the one or more document clusters; and based on a second similarity between the first vector and the one or more document clusters, determining, using the computing system, that the first document correlates to the at least one first historical document pattern contained within at least one of the one or more document clusters;

determine that at least one first historical document pattern of the one or more historical document patterns correlates to the first document; and based on a determination that the at least one first historical document pattern of the one or more historical document patterns correlates to the first document, extract the first remittance information from the first document based on the least one first historical document pattern.

* * * * *